US012786146B2

(12) United States Patent
Kondo

(10) Patent No.: US 12,786,146 B2
(45) Date of Patent: Nov. 3, 2026

(54) INFORMATION PROCESSING APPARATUS, REPORT CREATION SYSTEM, AND INFORMATION PROCESSING METHOD

(71) Applicant: Seiichi Kondo, Tokyo (JP)

(72) Inventor: Seiichi Kondo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/077,307

(22) Filed: Mar. 12, 2025

(65) Prior Publication Data

US 2025/0300949 A1 Sep. 25, 2025

(30) Foreign Application Priority Data

Mar. 21, 2024 (JP) ................................ 2024-044410
Dec. 2, 2024 (JP) ................................ 2024-209329

(51) Int. Cl.
*G06F 8/30* (2018.01)
*H04L 51/02* (2022.01)

(52) U.S. Cl.
CPC ................ *H04L 51/02* (2013.01); *G06F 8/30* (2013.01)

(58) Field of Classification Search
None
See application file for complete search history.

(56) References Cited

U.S. PATENT DOCUMENTS

2026/0004110 A1* 1/2026 Higgins ............... G06N 3/0475

FOREIGN PATENT DOCUMENTS

JP 2023-018851 A 2/2023

* cited by examiner

*Primary Examiner* — Cai Y Chen
(74) *Attorney, Agent, or Firm* — XSENSUS LLP

(57) ABSTRACT

An information processing apparatus includes circuitry that: receives, from a terminal apparatus, a request for acquiring screen information of an analysis screen of data; transmits the screen information to the terminal apparatus including a program for analysis causing the terminal apparatus to acquire the data managed by the application, create data for analysis from the acquired data, and upload the data for analysis to a generative AI system; in response to receipt of the data for analysis and a chat message related to analysis from the terminal apparatus, transmits to the generative AI system a request message that requests analysis of the data for analysis according to the chat message; receives a response message including an analysis result of the data for analysis from the generative AI system; and transmits a report including the analysis result to the terminal apparatus.

8 Claims, 21 Drawing Sheets

FIG. 10A

101A

```
curl https://api.openai.com/v1/threads ¥
  -H "Content-Type: application/json" ¥
  -H "Authorization: Bearer $OPENAI_API_KEY" ¥
  -H "OpenAI-Beta: assistants=v1" ¥
```

FIG. 10B

101B

```
{
  "id": "thread_abc123",
  ...
}
```

FIG. 11A

110A

```
curl https://api.openai.com/v1/files ¥
  -H "Authorization: Bearer $OPENAI_API_KEY" ¥
  -F purpose="fine-tune" ¥
  -F file="@mydata.csv"
```

FIG. 11B

110B

```
{
  "id": "file-abc123",
  ...
}
```

FIG. 13

130

```
curl https://api.openai.com/v1/threads/thread_abc123/messages ¥
  -H "Content-Type: application/json" ¥
  -H "Authorization: Bearer $OPENAI_API_KEY" ¥
  -H "OpenAI-Beta: assistants=v1" ¥
  -d '{
      "role": "user",
      "content": "Analyze the data appropriately",
      "file_ids": ["file-abc123"]
    }'
```

FIG. 14A

140A

```
curl https://api.openai.com/v1/threads/thread_abc123/runs ¥
  -H "Authorization: Bearer $OPENAI_API_KEY" ¥
  -H "Content-Type: application/json" ¥
  -H "OpenAI-Beta: assistants=v1" ¥
  -d '{
    "assistant_id": "asst_abc123"
  }'
```

FIG. 14B

140B

```
{
  "id": "run_abc123",
  ...
}
```

FIG. 15

150

```
curl https://api.openai.com/v1/threads/thread_abc123/runs/run_abc123/steps ¥
  -H "Authorization: Bearer $OPENAI_API_KEY" ¥
  -H "Content-Type: application/json" ¥
  -H "OpenAI-Beta: assistants=v1"
```

FIG. 16

160

```
{
 ...
 "data": [
  {
   "id": "step_abc123",
   ...
   "step_details": {
    "type": "message_creation",
    "message_creation": {
     "message_id": "msg_abc123"
    }
   },
   {
   "id": "step_abc456",
   ...
   "step_details": {
    "type": "tool_calls",
    "tool_calls": [
     {
      "code_interpreter": {
       "input": "import pandas as pd¥n... (Python PROGRAM CONTINUES)",
       "output": [
        {
         "type": "image",
         "image": {
          "file_id": "image-xyz789"
         }
        }
       ]
      }
     }
    ]
   }
  }
 ],
 ...
}
```

FIG. 17

170

```
curl https://api.openai.com/v1/threads/thread_abc123/messages/msg_abc123 ¥
  -H "Content-Type: application/json" ¥
  -H "Authorization: Bearer $OPENAI_API_KEY" ¥
  -H "OpenAI-Beta: assistants=v1"
```

FIG. 18

180

```
{
  ...
  "content": [
    {
      "type": "text",
      "text": {
        "value": "... at the Tokyo branch office in the summer season ...",
        "annotations": []
      }
    }
  ]
}
```

FIG. 19

190

```
curl https://api.openai.com/v1/files/image-xyz789/content ¥
  -H "Authorization: Bearer $OPENAI_API_KEY"
```

INFORMATION PROCESSING APPARATUS, REPORT CREATION SYSTEM, AND INFORMATION PROCESSING METHOD

CROSS-REFERENCE TO RELATED APPLICATIONS

This patent application is based on and claims priority pursuant to 35 U.S.C. § 119 (a) to Japanese Patent Application Nos. 2024-044410, filed on Mar. 21, 2024, and 2024-209329, filed on Dec. 2, 2024, in the Japan Patent Office, the entire disclosure of each is hereby incorporated by reference herein.

BACKGROUND

Technical Field

The present disclosure relates to an information processing apparatus, a report creation system, and an information processing method.

Related Art

Recent programming assistance technology in the related art reduces or omits the writing of program code. An example of such technology uses artificial intelligence (AI) to automatically generate program code.

A program manages various types of data. Analyzing data managed by a program and creating a report based on the analysis involves grasping the content and the analysis method of the data managed by the program, which increases the difficulty. Therefore, assistance for reducing or omitting the writing of program code is also desirably provided in creating a report on data managed by a program.

SUMMARY

According to an embodiment of the present disclosure, an information processing apparatus communicably connected with a terminal apparatus and a generative AI system via a network, including a communication circuit and a chat control circuit. The communication circuit receives, from the terminal apparatus, a request for acquiring screen information of an analysis screen of data managed by an application provided by the information processing apparatus or an application service, and transmits the screen information to the terminal apparatus. The screen information includes a program for analysis. The program for analysis causes the terminal apparatus to acquire the data managed by the application, create data for analysis from the acquired data, and upload the data for analysis to the generative AI system. In response to receipt of the data for analysis and a chat message related to analysis from the terminal apparatus, the chat message being input on the analysis screen displayed on the terminal apparatus, the chat control circuit transmits, to the generative AI system, a request message that requests analysis of the data for analysis according to the chat message. The chat control circuit receives a response message including an analysis result of the data for analysis from the generative AI system. The communication circuit further transmits a report including the analysis result to the terminal apparatus.

According to an embodiment of the present disclosure, a report creation system includes a terminal apparatus including terminal circuitry; and an information processing apparatus communicably connected with the terminal apparatus and a generative AI system via a network including apparatus circuitry. The apparatus circuitry receives, from a terminal apparatus, a request for acquiring screen information of an analysis screen of data managed by an application provided by an information processing apparatus or an application service, and transmits the screen information to the terminal apparatus. The screen information includes a program for analysis. The program for analysis causes the terminal apparatus to acquire the data managed by the application, create data for analysis from the acquired data, and upload the data for analysis to a generative AI system. In response to receipt of the data for analysis and a chat message related to analysis from the terminal apparatus, the chat message being input on the analysis screen displayed on the terminal apparatus, the circuitry transmits, to the generative AI system, a request message that requests analysis of the data for analysis according to the chat message. The circuitry receives a response message including an analysis result of the data for analysis from the generative AI system. The circuitry transmits a report including the analysis result to the terminal apparatus. The terminal circuitry receives an operation for starting analysis of data on the analysis screen displayed on a display, executes the program for analysis in response to the operation for starting analysis of data to create the data for analysis, and transmit, to the information processing apparatus, a request message that requests uploading of the data for analysis to the generative AI system, and displays the report received from the information processing apparatus on the display.

According to an embodiment of the present disclosure, an information processing method performed by an information processing apparatus communicably connected with a terminal apparatus and a generative AI system via a network, includes receiving, from the terminal apparatus, a request for acquiring screen information of an analysis screen of data managed by an application provided by the information processing apparatus or an application service; transmitting the screen information to the terminal apparatus, the screen information including a program for analysis, the program for analysis causing the terminal apparatus to acquire the data managed by the application, create data for analysis from the acquired data, and upload the data for analysis to the generative AI system; in response to receipt of the data for analysis and a chat message related to analysis from the terminal apparatus, the chat message being input on the analysis screen displayed on the terminal apparatus, transmitting, to the generative AI system, a request message that requests analysis of the data for analysis according to the chat message; receiving a response message including an analysis result of the data for analysis from the generative AI system; and transmitting a report including the analysis result to the terminal apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 10A and 10B are diagrams illustrating an example of a request message that requests creation of a thread and a corresponding response message in the second embodiment of the present disclosure;

FIGS. 11A and 11B are diagrams illustrating an example of a request message that requests uploading of a file for analysis and a corresponding response message in the second embodiment of the present disclosure;

FIG. 13 is a diagram illustrating an example of a request message that requests addition of a chat message to the thread in the second embodiment of the present disclosure;

FIGS. 14A and 14B are diagrams illustrating an example of a request message that requests execution of an assistant according to the chat message and a corresponding response message in the second embodiment of the present disclosure;

FIG. 15 is a diagram illustrating an example of a request message that requests acquisition of an execution status of a process identified by an execution identification (ID) in the second embodiment of the present disclosure;

FIG. 16 is a diagram illustrating an example of a response message including the execution status in the second embodiment of the present disclosure;

FIG. 17 is a first diagram illustrating a request message that requests acquisition of an analysis result in the second embodiment of the present disclosure;

FIG. 18 is a diagram illustrating an example of a response message including text data in the second embodiment of the present disclosure;

FIG. 19 is a second diagram illustrating a request message that requests acquisition of an analysis result in the second embodiment of the present disclosure;

Figure 1:
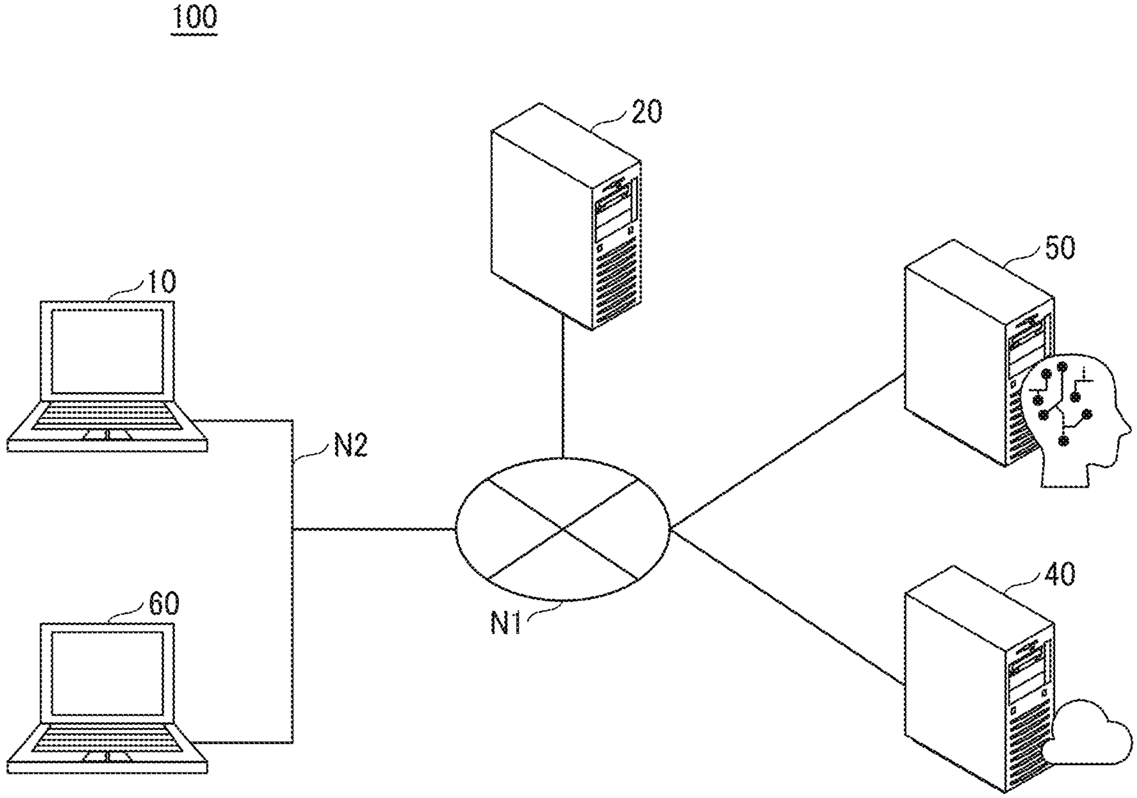
FIG. 1 is a diagram for describing an example of a system configuration of a report creation system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

FIG. 1 is a diagram for describing an example of a system configuration of a report creation system according to a first embodiment of the present disclosure.

A report creation system 100 includes an information processing system 20, a user terminal 10, and a developer terminal 60.

In the report creation system 100, the information processing system 20 and the user terminal 10, and the information processing system 20 and the developer terminal 60, are communicably connected to each other via networks N1 and N2. The information processing system 20 communicates with a generative AI system 50 via the network N1. The user terminal 10 and the developer terminal 60 communicate with the generative AI system 50 and an application service 40, which is an external system, via the networks N1 and N2. The information processing system 20 may communicate with the application service 40 via the network N1.

The network N1 is a network for a wide area, such as Internet or a wide area network (WAN). The network N2 may be a local area network (LAN), Wi-Fi®, a wide area Ethernet™, or a mobile phone network of 4G, 5G, 6G, or the like.

The user terminal 10 is, for example, a terminal apparatus used by a user who uses a service provided by the application service 40, such as a personal computer (PC), a smartphone, or a tablet terminal. The developer terminal 60 is, for example, a terminal apparatus used by a developer of the information processing system 20.

The user terminal 10 and the developer terminal 60 are installed on premises such as a company or a home and are connected to the network N2. Note that the user terminal 10 and the developer terminal 60 are not necessarily connected to the network N2 all the time, and may be connected to the network N2 when using the information processing system 20, the generative AI system 50, or the application service 40. A web browser or a native application operates on the user terminal 10 or the developer terminal 60. The user terminal 10 or the developer terminal 60 can use various services provided by the information processing system 20, the generative AI system 50, or the application service 40.

The application service 40 refers to one or more information processing apparatuses that provide an application to be executed by a user. The application provided by the application service 40 is, for example, a database web application that manages data in a table format.

The user is allowed to set fields of the application in any manner to customize the application to store, read, or process data related to the user's work. In the present embodiment, "data analysis" refers to, for data stored in a database thus prepared in advance, aggregating values for each field included in the data, visualizing a change in the value of the field included in the data, processing the data, and the like. In the description below, the term "application" may be simply referred to as an "app".

The application service 40 may include various services provided via a network, for example, a cloud service, an application service provider (ASP), and Software as a Service (SaaS). For example, an example of the various services is provision of a database or a storage service. The application service 40 may be on the Internet or on premises.

The generative AI system 50 provides a service that allows a user to chat with an AI in a chat-based style. An example of such a generative AI system 50 is a system that uses a large language model (LLM). An LLM is a natural language processing model trained on a large amount of text data.

The generative AI system 50 takes in a vast amount of text in advance, and performs deep learning or reinforcement learning to learn the knowledge from the vast amount of text. The generative AI system 50 uses this knowledge to provide a reply message to a chat message.

The generative AI system 50 has an interface that receives a chat message or file input by the user. The chat message or file received by the interface is called a "prompt". As the prompt, a chat message of an instruction or question is input. The chat message may be, for example, a conversational sentence or phrase in a natural language spoken by people. An image may be handled as the chat message. The generative AI system 50 that generates sentences in response to a chat message may be referred to as a "generative AI".

Example features of the generative AI system 50 include the capabilities to carry on a chat in a natural flow, expand ideas and make suggestions in a field in which the user lacks knowledge, and output accurate program code.

In the present embodiment, the use of the generative AI system 50 having such features allows the information processing system 20 to carry on a chat with the user in a natural flow.

Examples of the generative AI system 50 include systems that use an LLM such as GPT-3®, GPT-4®, Transformer™, and BERT®. The report creation system 100 may use, for example, ChatGPT using GPT-3 or GPT-4. Alternatively, the report creation system 100 may use a system using another LLM.

The generative AI system 50 may have a chat history holding function (Persistent Threads) for creating a thread to hold a history of a chat between the user of the user terminal 10 and the generative AI system 50, and a file receiving function (Data Retrieval) for receiving a file uploaded from outside the generative AI system 50. The generative AI system 50 may also have, for example, a program generation/execution function (Code Interpreter) for automatically generating and executing program code as occasion arises, and a function call function (Function Calling) for calling a function designated in accordance with a prompt.

The chat history holding function (Persistent Threads), the file receiving function (Data Retrieval), the program generation/execution function (Code Interpreter), and the function call function (Function Calling) described above may be implemented by application programming interfaces (APIs) provided by the generative AI system 50 to the information processing system 20. More specifically, the APIs provided by the generative AI system 50 may be, for example, Assistants APIs (assistant APIs) made available from the generative AI system 50.

In the description below, for example, calling the APIs provided by the generative AI system 50 to execute these functions may be referred to as "executing assistants".

After receiving an operation for selecting an application subjected to data analysis from the user terminal 10, the information processing system 20 outputs, to the user terminal 10, a program causing the user terminal 10 to create a file for use in data analysis and transmit the file to the generative AI system 50.

More specifically, after an application subjected to data analysis is selected on the user terminal 10, the information processing system 20 outputs, to the user terminal 10, a program causing the user terminal 10 to create a file for analysis from the data managed by the application and transmit the file for analysis to the generative AI system 50. In the description below, the program output to the user terminal 10 from the information processing system 20 may be referred to as a program for analysis. The file for analysis is an example of data for analysis.

The application subjected to data analysis is one of the applications managed by the application service 40. In the description below, an application subjected to data analysis is referred to as an analysis-target application, and data managed by the application subjected to data analysis is referred to as analysis-target data.

After receiving a chat message related to data analysis from the user terminal 10, the information processing system 20 includes the chat message in a request message, and transmits the request message to the generative AI system 50. After receiving an analysis result of the data from the generative AI system 50, the information processing system 20 transmits the analysis result to the user terminal 10. At this time, the information processing system 20 creates a report including the analysis result acquired from the generative AI system 50, and transmits the report including the analysis result to the user terminal 10.

As described above, in the present embodiment, the user just selects an analysis-target application and inputs a chat message related to data analysis on the user terminal 10, and thus can obtain an analysis result of analysis-target data. That is, the user just selects an analysis-target application and inputs a chat message instructing analysis on the user terminal 10, and thus can receive a report including an analysis result.

In the example in FIG. 1, the application service 40 is provided separately from the information processing system 20. However, the configuration is not limited to this one, the information processing system 20 and the application service 40 may be integrated together. That is, the application service 40 may include the functions of the information processing system 20, or the information processing system 20 may include the functions of the application service 40. The application service 40 and the generative AI system 50 may be integrated together. The generative AI system 50 and the information processing system 20 may be integrated together. The information processing system 20, the application service 40, and the generative AI system 50 may be integrated together.

The information processing system 20, the application service 40, and the generative AI system 50 may be provided by the same provider or by different providers.

The information processing system 20 may be implemented by cloud computing or by a single information processing apparatus. Cloud computing refers to a style in which network resources are used without concern for specific hardware resources. The information processing system 20 may be on the Internet or on premises.

The functions of the information processing system 20 may be distributed to a plurality of information processing apparatuses. A plurality of information processing systems 20 having the same functions are provided, and the number of information processing systems 20 that execute processes may be changed in accordance with the processing load.

The user terminal 10 is, for example, a terminal apparatus used by a user who receives a service provided by the application service 40, such as a PC, a smartphone, or a tablet terminal.

The user terminal 10 may be an information processing apparatus. Examples of such an information processing apparatus include an output device such as an electronic whiteboard or digital signage, a head-up display (HUD) device, industrial machinery, an image-capturing device, a sound collector, medical equipment, a smart appliance, a mobile phone, a smartphone, a tablet terminal, a game machine, a personal digital assistant (PDA), a digital camera, and a wearable PC.

Figure 2:
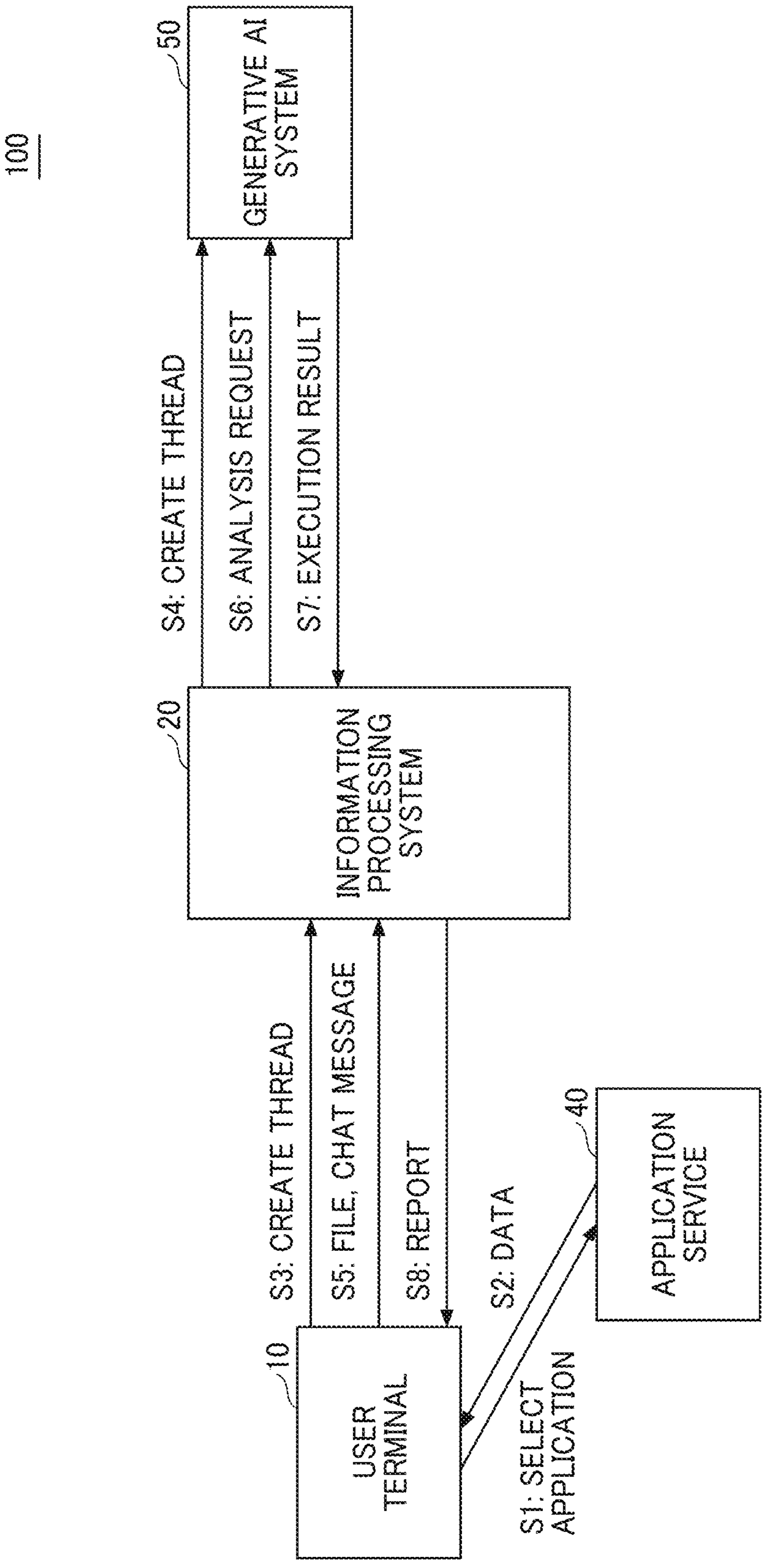
FIG. 2 is a diagram for describing an overview of an operation of the report creation system according to the first embodiment of the present disclosure.

An overview of an operation of the report creation system 100 will be described below with reference to FIG. 2. FIG. 2 is a diagram for describing the overview of the operation of the report creation system according to the first embodiment of the present disclosure.

In step S1, the user terminal 10 of the report creation system 100 selects an analysis-target application. In step S2, the user terminal 10 acquires analysis-target data from the application service 40.

In step S3 and step S4, the user terminal 10 requests, via the information processing system 20, the generative AI system 50 to create a thread. In step S5, the user terminal 10 transmits a file for analysis created from the analysis-target data and a chat message input by the user to the information processing system 20. The chat message may be a message related to data analysis, for example, "Create a graph". Note that examples of the chat message include not only a message indicating a specific analysis method but also a message indicating a desire such as "Analyze the data appropriately".

After receiving the file for analysis and the chat message input by the user, the information processing system 20 transmits a request message that requests analysis using the file for analysis to the generative AI system 50 in step S6. Specifically, the information processing system 20 transmits a request message for adding the file for analysis to the thread and a request message that requests analysis of the file for analysis to the generative AI system 50.

In step S7, the generative AI system 50 transmits, to the information processing system 20, an analysis result of the analysis performed in response to the request message.

In step S8, the information processing system 20 creates a report including the analysis result received from the generative AI system 50, and transmits the report to the user terminal 10.

As described above, in the present embodiment, simply selecting an analysis-target application from among applications provided by the application service 40 and inputting a chat message related to data analysis can provide a report including the analysis result of data.

A hardware configuration of the information processing system 20, the user terminal 10, and the developer terminal 60 included in the report creation system 100 will be described with reference to FIG. 3.

Figure 3:
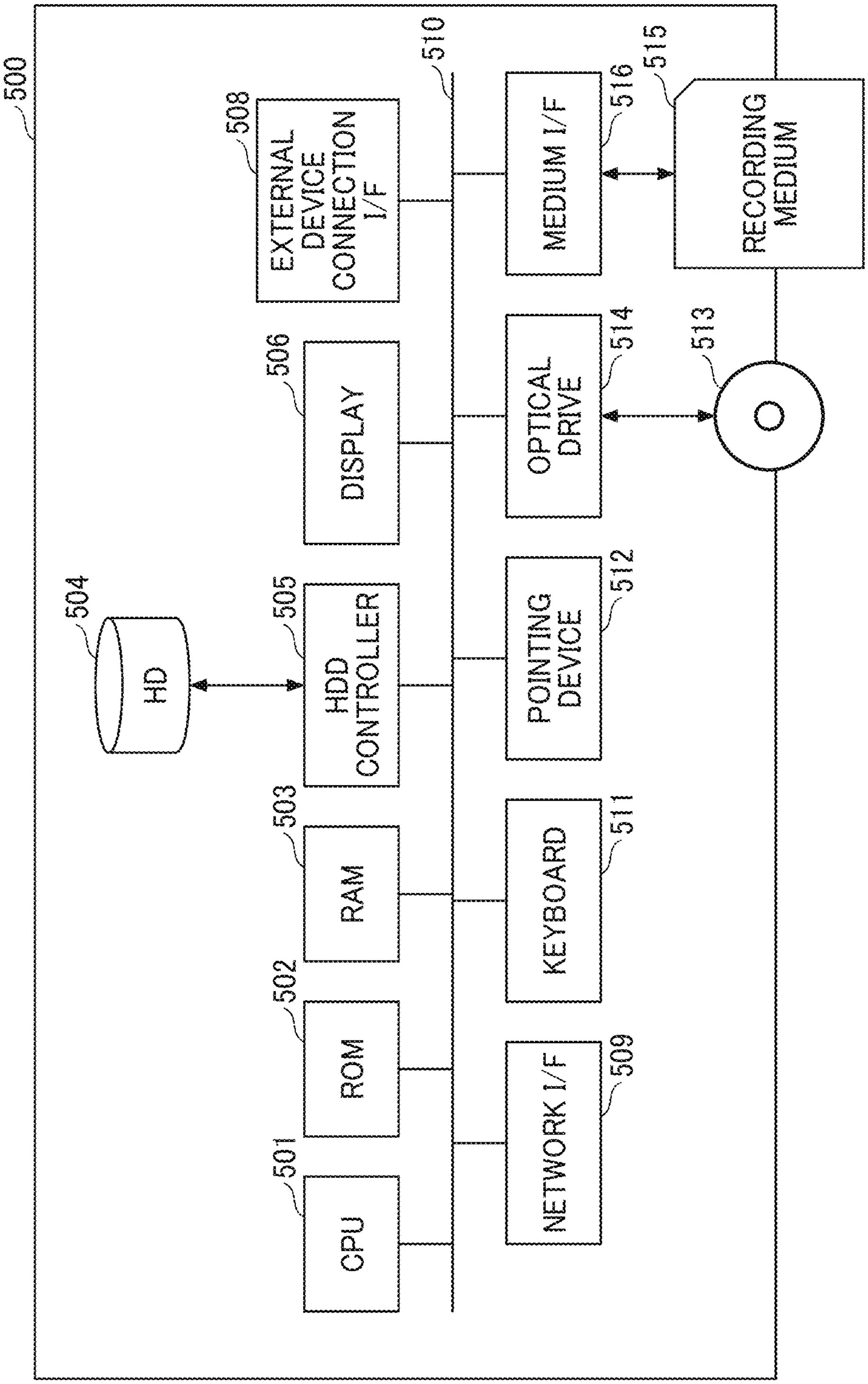
FIG. 3 is a diagram illustrating an example of a hardware configuration of an information processing system, a user terminal, and a developer terminal according to the first embodiment of the present disclosure.

FIG. 3 is a diagram illustrating an example of the hardware configuration of the information processing system, the user terminal, and the developer terminal according to the first embodiment of the present disclosure. As illustrated in FIG. 3, the information processing system 20, the user terminal 10, and the developer terminal 60 are each implemented by a computer 500. The computer 500 includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

The CPU 501 controls the entire operation of the computer 500. The ROM 502 stores an initial program loader (IPL) or any other program used for booting the CPU 501. The RAM 503 is used as a work area for the CPU 501. The HD 504 stores various kinds of data such as a program. The HDD controller 505 controls reading or writing of various kinds of data from or to the HD 504 under control of the CPU 501. The display 506 displays various kinds of information such as a cursor, a menu, a window, text, or an image. The external device connection I/F 508 is an interface for connecting various external devices to the computer 500. Examples of the external devices include a Universal Serial Bus (USB) memory and a printer.

The network I/F 509 is an interface for performing data communication using the network N2. The bus line 510 is, for example, an address bus or a data bus for electrically connecting the components illustrated in FIG. 3, such as the CPU 501, with each other.

The keyboard 511 is an example of an input device including a plurality of keys for inputting characters, numerical values, various instructions, or the like. The pointing device 512 is an example of an input device used to select or execute a specific instruction, select a target for processing, or move a cursor. The optical drive 514 controls reading or writing of various kinds of data from or to an optical disc 513 such as a digital versatile disc-rewritable (DVD-RW), which is an example of a removable recording medium. The optical disc 513 is not limited to a DVD-RW and may be a digital versatile disk-recordable (DVD-R) or the like. The medium I/F 516 controls reading or writing (storing) of data from or to a recording medium 515 such as a flash memory.

Figure 4:
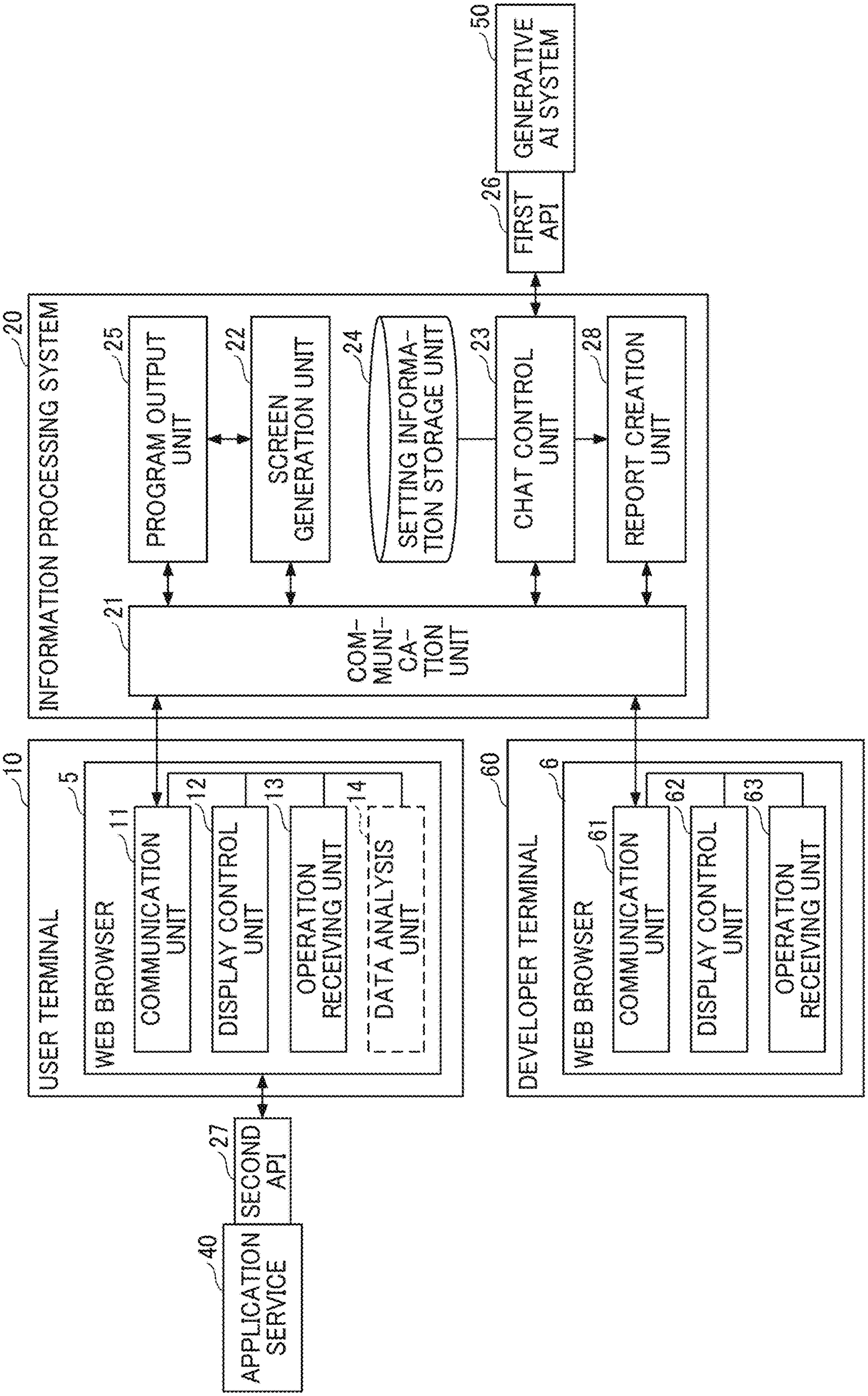
FIG. 4 is a diagram for describing functions of the information processing system, the user terminal, and the developer terminal included in the report creation system according to the first embodiment of the present disclosure.

Functions of the information processing system 20, the user terminal 10, and the developer terminal 60 included in the report creation system 100 will be described with reference to FIG. 4. FIG. 4 is a diagram for describing the functions of the information processing system, the user terminal, and the developer terminal included in the report creation system according to the first embodiment of the present disclosure.

The functions of the information processing system 20 will be described. The information processing system 20 includes a communication unit 21, a screen generation unit 22, a chat control unit 23, a setting information storage unit 24, a program output unit 25, and a report creation unit 28. These functional units of the information processing system 20 are functions or units implemented as a result of the CPU 501 illustrated in FIG. 3 executing instructions included in one or more programs installed on the information processing system 20.

The setting information storage unit 24 is implemented by a memory such as the HD 504 or the RAM 503 illustrated in FIG. 3. The setting information storage unit 24 is not necessarily included in the information processing system 20, and may be on network accessible to the information processing system 20.

The communication unit 21 transmits and receives various kinds of information to and from the user terminal 10. The communication unit 21 transmits screen information of an analysis screen of the analysis-target application to the user terminal 10. The communication unit 21 receives, from the user terminal 10, a chat message input for data analysis by the user of the user terminal 10. The communication unit 21 transmits and receives various kinds of information to and from the developer terminal 60. The communication unit 21 transmits screen information of an input screen for setting information to the developer terminal 60. The communication unit 21 receives setting information input by a developer from the developer terminal 60, and stores the setting information in the setting information storage unit 24. The communication unit 21 transmits, to the user terminal 10, a response message (reply) received by the chat control unit 23 from the generative AI system 50. The communication unit 21 is an example of a first communication unit.

The screen generation unit 22 generates screen information of a screen (web page) to be displayed by the user terminal 10 and the developer terminal 60.

More specifically, the screen generation unit 22 generates the screen information of the analysis screen of the analysis-target application to be displayed by the user terminal 10. The screen information of the analysis screen includes a program for analysis that implements a data analysis unit 14 (described later) in the user terminal 10.

Note that the web page is provided as part of a web app. The screen information is a program written in Hyper Text Markup Language (HTML), JavaScript® Object Notation (JSON), Extensible Markup Language (XML), a script language, a Cascading Style Sheet (CSS), and the like. The structure of the web page is mainly specified by HTML, the operation of the web page is defined by the script language, and the style of the web page is specified by the CSS.

The chat control unit 23 calls a first API 26 to transmit a request message to the generative AI system 50.

The first API 26 is one or more APIs made available from the generative AI system 50. The first API 26 may include an assistant API. The first API 26 may hold an assistant ID as identification information for identifying the first API 26.

The chat control unit 23 receives, from the generative AI system 50, a response message to the request message as a result of calling the first API 26. The response message includes a reply message to the chat message and an analysis result of the analysis-target data, for example.

The setting information storage unit 24 stores the setting information. The setting information will be described.

In the present embodiment, the setting information is information to be used for analysis of a file for analysis. That is, the setting information is information to be used by the generative AI system 50 to analyze analysis-target data, and includes a function that defines data to be acquired from the application service 40.

Specifically, the function that defines data to be acquired is a function that allows the generative AI system 50 to request the information processing system 20 to acquire the analysis-target data.

In the description below, the function that allows the generative AI system 50 to request the information processing system 20 to acquire the analysis-target data may be referred to as a data acquisition function. In the present embodiment, the setting information is stored in the setting information storage unit 24 by the developer before the user of the user terminal 10 selects the analysis-target application. Note that the setting information is not necessarily used in all cases, and the setting information may not be used depending on the application.

After the communication unit 21 receives, from the user terminal 10, a request message that requests acquisition of the screen information of the analysis screen of the analysis-target application, the program output unit 25 outputs, to the screen generation unit 22, the program for analysis for causing the generative AI system 50 to analyze the analysis-target data.

The program for analysis is written in JavaScript® (® will be omitted below). When executed on the user terminal 10, the program for analysis causes the user terminal 10 to execute a process of creating a file for analysis from the analysis-target data and transmitting (uploading) the file for analysis to the generative AI system 50 via the information processing system 20.

The report creation unit 28 uses an analysis result output by the generative AI system 50 for the file for analysis, to create a report. In the present embodiment, the report may be data such as image data in which the analysis result acquired from the generative AI system 50 is arranged.

Specifically, for example, the report may be Portable Document Format (PDF) data or the like. The report may be image data of a page in which an image, a graph, text data, and the like acquired as the analysis result from the generative AI system 50 are arranged. Note that the report is not limited to the image data. The report may be document data or the like, and may be data in any format including the analysis result.

Functions of the user terminal 10 will be described. The user terminal 10 includes a web browser 5. The web browser 5 includes a communication unit 11, a display control unit 12, and an operation receiving unit 13. These functional units are functions or units that are implemented by the CPU 501 illustrated in FIG. 3 executing instructions included in one or more programs installed on the user terminal 10.

The web browser 5 includes a web browser application preinstalled on the user terminal 10 and an application that displays web content with a web viewing function.

Note that the communication unit 11, the display control unit 12, and the operation receiving unit 13 may be implemented by JavaScript.

The communication unit 11 transmits and receives various kinds of information to and from the information processing system 20. The communication unit 11 receives screen information of a portal screen from the application service 40, and receives the screen information of the analysis screen that receives a chat message related to analysis, from the information processing system 20. The communication unit 11 transmits the chat message and operation information on an operation performed on the user terminal 10, to the information processing system 20. Note that the communication unit 11 can directly communicate with the generative AI system 50. The communication unit 11 is an example of a second communication unit.

The display control unit 12 interprets screen information of various screens to display the screens on the display 506.

The operation receiving unit 13 receives various user operations performed on the various screens displayed on the display 506.

The user terminal 10 receives the screen information of the analysis screen including the program for analysis from the information processing system 20.

After receiving the screen information of the analysis screen, the user terminal 10 executes the program for analysis included in the screen information, and thus implements the functions of the data analysis unit 14. That is, the web browser 5 of the user terminal 10 executes JavaScript included in the screen information of the analysis screen acquired from the information processing system 20, and thus includes the data analysis unit 14.

The data analysis unit 14 calls a second API 27 to transmit a request message to the application service 40. The request message requests editing of an application, and includes a parameter related to the application (such as a field name of a database or a data format) and content of the editing.

The second API 27 is one or more APIs made available from the application service 40. The data analysis unit 14 receives, from the application service 40, a response message to the request message as a result of calling the second API 27. The response message includes the analysis-target data.

The user terminal 10 executes a native app in some cases. The native app is an application that is executable when being installed on the user terminal 10. In the case of the native app, the user terminal 10 holds the screen information of the analysis screen and transmits information to be displayed in a form of JSON, XML, or the like.

Functions of the developer terminal 60 will be described. The developer terminal 60 includes a communication unit 61, a display control unit 62, and an operation receiving unit 63. These functional units are functions or units that are implemented by the CPU 501 illustrated in FIG. 3 executing instructions included in one or more programs installed on the developer terminal 60. For example, the communication unit 61, the display control unit 62, and the operation receiving unit 63 may be implemented by at least one of a web browser 6 or JavaScript. When the developer terminal 60 executes a native app, the native app implements the communication unit 61, the display control unit 62, and the operation receiving unit 63.

The communication unit 61 transmits and receives various kinds of information to and from the information processing system 20. The communication unit 61 receives screen information related to input of the setting information from the information processing system 20. The communication unit 61 transmits the setting information and operation information on an operation performed on the developer terminal 60, to the information processing system 20. Note that the communication unit 61 may communicate with the generative AI system 50 and the application service 40.

The display control unit 62 interprets screen information of various screens to display the screens on the display 506.

The operation receiving unit 63 receives various user operations performed on the various screens displayed on the display 506.

Figure 5A:
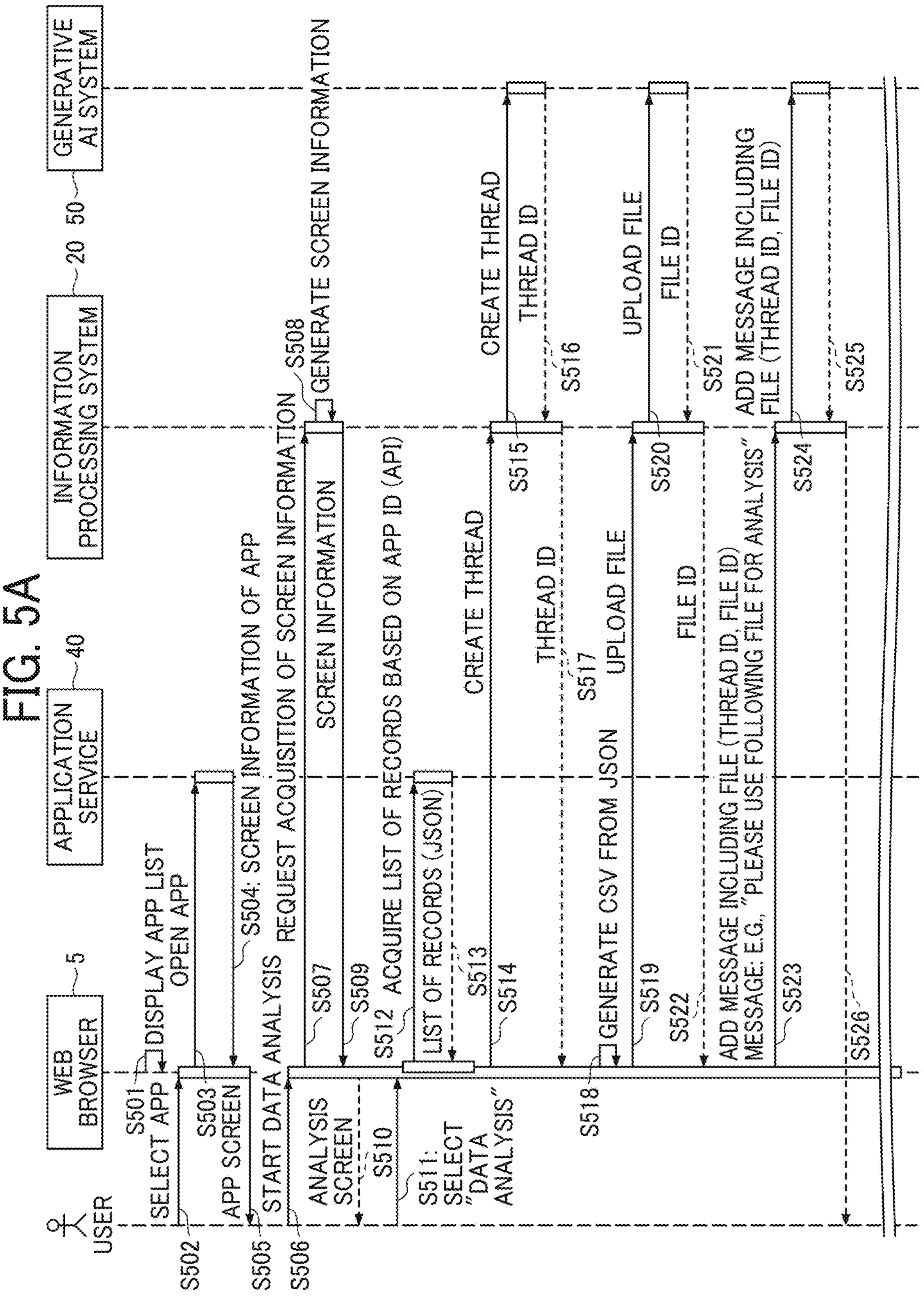
FIG. 5A is a first sequence diagram for describing the operation of the report creation system according to the first embodiment of the present disclosure.
Figure 5B:
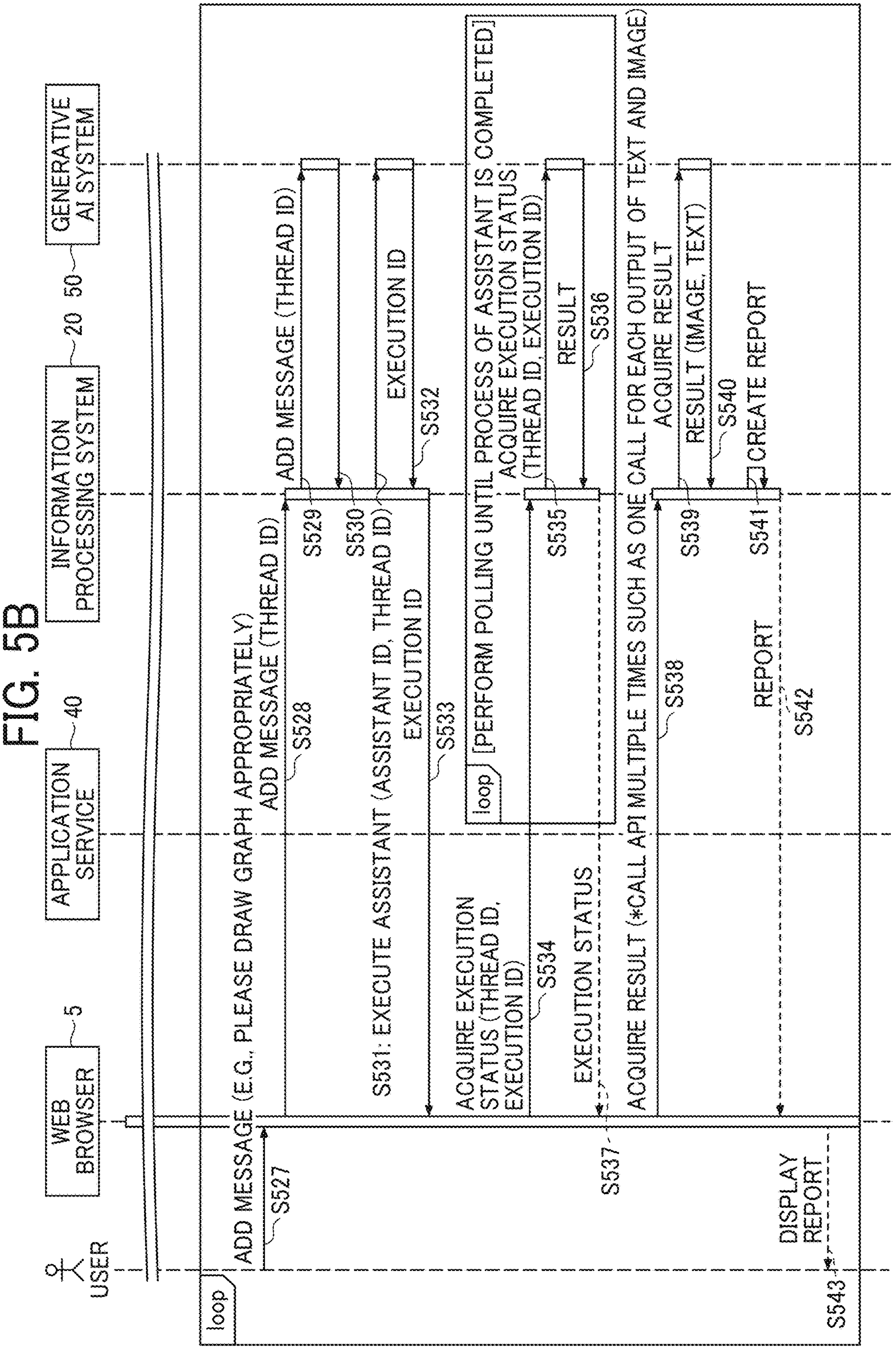
FIG. 5B is a second sequence diagram for describing the operation of the report creation system according to the first embodiment of the present disclosure.

An operation of the report creation system 100 will be described with reference to FIGS. 5A and 5B. FIG. 5A is a first sequence diagram for describing the operation of the report creation system 100. FIG. 5B is a second sequence diagram for describing the operation of the report creation system 100.

In step S501, the web browser 5 of the user terminal 10 of the report creation system 100 displays an application list screen of applications managed by the application service 40.

The application list screen may be displayed on the web browser 5 in response to an operation for displaying a list of applications on a portal screen of the application service 40 displayed on the web browser 5 of the user terminal 10, for example. In response to this operation, the web browser 5 may acquire the application list screen from the application service 40.

In step S502, the web browser 5 receives an operation for selecting an analysis-target application on the application list screen.

In step S503, the web browser 5 requests the application service 40 to start the selected application.

Specifically, in the web browser 5, the communication unit 11 establishes a connection to a Universal Resource Locator (URL) of the application service 40. Since the analysis-target application is selected on the user terminal 10, the communication unit 11 generates a Hypertext Transfer Protocol (HTTP) request including a URL of an application screen of the analysis-target application, and transmits the generated HTTP request to the application service 40. The application screen is a screen for receiving various operations on the application and may be a home screen of the application. In the description below, the application screen is referred to as an app screen.

In step S504, after receiving the HTTP request from the user terminal 10, the application service 40 transmits screen information of the app screen to the web browser 5.

Specifically, the application service 40 transmits the screen information of the app screen (such as HTML, JavaScript, and CSS) to the web browser 5.

In step S505, in the web browser 5, the communication unit 11 receives the screen information of the app screen, and the display control unit 12 displays the app screen based on the screen information.

In step S506, in the web browser 5, the operation receiving unit 13 receives an operation for starting analysis of the analysis-target data on the app screen. In step S507, the communication unit 11 transmits a request message that requests acquisition of screen information of an analysis screen to the information processing system 20. The request message transmitted to the information processing system 20 may include an app ID that is identification information for identifying the analysis-target application selected in step S502.

In step S508, the information processing system 20 generates the screen information of the analysis screen (such as HTML, JavaScript, and CSS).

Generation of the screen information of the analysis screen by the information processing system 20 will be described. After the information processing system 20 receives the request message that requests acquisition of the analysis screen, the program output unit 25 supplies the screen generation unit 22 with the program for analysis that causes the user terminal 10 to acquire the analysis-target data, create a file for analysis from the acquired analysis-target data, and transmit the file for analysis to the generative AI system 50.

The screen generation unit 22 includes the program for analysis written in JavaScript in the screen information of the analysis screen.

In step S509, in the information processing system 20, the communication unit 21 transmits the screen information of the analysis screen to the web browser 5.

In the web browser 5, the communication unit 11 receives the screen information of the analysis screen, and the display control unit 12 displays the analysis screen based on the screen information in step S510. In step S511, in the web browser 5, the operation receiving unit 13 receives an operation for starting analysis of the analysis-target data on the analysis screen.

After receiving the operation for starting analysis of the analysis-target data, the web browser 5 executes the program for analysis to implement the data analysis unit 14. In step S512, in the web browser 5, the data analysis unit 14 generates a request message that requests acquisition of the analysis-target data, and the communication unit 11 transmits the generated request message to the application service 40.

Specifically, the web browser 5 calls the second API 27 to transmit the request message that requests acquisition of the analysis-target data to the application service 40. This request message includes the app ID of the analysis-target application.

Note that the analysis-target data is information written in a JSON format and is data stored in the database managed by the application in a table format.

The application service 40 receives the request message, and transmits, as the analysis-target data (in the JSON format), data managed by the application identified by the app ID to the web browser 5 in step S513.

In step S514, in the web browser 5, the data analysis unit 14 generates a request message that requests creation of a thread, and the communication unit 11 transmits the generated request message to the information processing system 20. The information processing system 20 receives this request message, and the chat control unit 23 transmits the request message that requests creation of a thread to the generative AI system 50 in step S515.

In step S516, the information processing system 20 acquires a thread ID of the created thread from the generative AI system 50. In step S517, the communication unit 21 transmits the acquired thread ID to the web browser 5. The thread ID is identification information for identifying a thread.

After the web browser 5 receives the thread ID, the data analysis unit 14 generates data in a comma-separated values (CSV) format from the analysis-target data in the JSON format acquired in step S513, and uses the data in the CSV format as a file for analysis in step S518.

In step S519, in the web browser 5, the data analysis unit 14 generates a request message that requests uploading of the file for analysis to the generative AI system 50, and the communication unit 11 transmits the generated request message to the information processing system 20. This request message includes the file for analysis.

In step S520, in the information processing system 20, the communication unit 21 receives the request message from the web browser 5, and the chat control unit 23 transmits the request message to the generative AI system 50. Specifically, the information processing system 20 calls the first API 26 to transmit, to the generative AI system 50, the request message that requests uploading of the file for analysis. That is, the information processing system 20 calls the file receiving function of the generative AI system 50 via the first API 26, and thus uploads the file for analysis to the generative AI system 50.

After the file for analysis is uploaded, the generative AI system 50 transmits a file ID for identifying the uploaded file for analysis to the information processing system 20 in step S521. In step S522, in the information processing system 20, the chat control unit 23 receives the file ID, and the communication unit 21 transmits the received file ID to the web browser 5.

After the web browser 5 receives the file ID, the data analysis unit 14 generates a request message that requests designation of the file for analysis to be referred to by the thread, and the communication unit 11 transmits the generated request message to the information processing system 20 in step S523. In step S524, in the information processing system 20, the communication unit 21 receives the request message from the web browser 5, and the chat control unit 23 transmits the request message to the generative AI system 50.

The request message transmitted to the generative AI system 50 includes the thread ID and the file ID. In the present embodiment, this designation of the file for analysis to be referred to by the thread allows the generative AI system 50 to recognize the uploaded file for analysis as the file to be analyzed.

After the file for analysis to be referred to by the thread is designated, the generative AI system 50 transmits a response message indicating the designation to the information processing system 20 in step S525. In step S526, in the information processing system 20, the chat control unit 23 receives the response message, and the communication unit 21 transmits the response message to the web browser 5.

In step S527, the web browser 5 receives input of a chat message related to analysis from the user. In step S528, the data analysis unit 14 generates a request message that requests addition of the chat message related to analysis to the thread, and the communication unit 11 transmits the generated request message to the information processing system 20. The chat message may be input with a keyboard or by voice. The request message transmitted to the information processing system 20 includes the thread ID.

In step S529, in the information processing system 20, the communication unit 21 receives the request message from the web browser 5, and the chat control unit 23 transmits the request message to the generative AI system 50.

After adding the chat message to the thread identified by the thread ID, the generative AI system 50 transmits a response message indicating the addition to the information processing system 20 in step S530. In the information processing system 20, the chat control unit 23 receives the response message. In step S531, the chat control unit 23 transmits a request message that requests execution of an assistant according to the chat message to the generative AI system 50.

The chat message added to the thread is a chat message related to analysis of the file for analysis. Thus, the request message transmitted to the generative AI system 50 in step S531 is a request message including the chat message related to analysis and requesting analysis of the file for analysis.

In response to this request message, the generative AI system 50 starts executing the assistant, and transmits a response message including an execution ID for identifying a process in execution to the information processing system 20 in step S532.

Specifically, for example, the generative AI system 50 uses the program generation/execution function called by the request message that requests analysis of the file for analysis to generate program code for analyzing the file for analysis and start executing the generated program code, and transmits the execution ID to the information processing system 20. That is, the request message that requests analysis of the file for analysis is a request message for calling the program generation/execution function provided by the generative AI system 50.

In step S533, in the information processing system 20, the chat control unit 23 receives the response message including the execution ID, and the communication unit 21 transmits the execution ID to the web browser 5.

In step S534, in the web browser 5, the data analysis unit 14 generates a request message that requests acquisition of an execution status of the process identified by the execution ID, and the communication unit 11 transmits the request message to the information processing system 20. This request message includes the thread ID and the execution ID.

In step S535, the information processing system 20 transmits the request message received from the web browser 5, to the generative AI system 50. In step S536, the generative AI system 50 transmits a response message including the execution status of the process identified by the execution ID included in the request message, to the information processing system 20. In the present embodiment, the execution status indicates a progress of the process identified by the execution ID. The execution status may include various kinds of data obtained by the process identified by the execution ID.

In the information processing system 20, the chat control unit 23 receives the response message including the execution status. In step S537, the communication unit 21 transmits the received response message to the web browser 5.

In the present embodiment, the operation from step S534 to step S537 is repeated until the execution status indicates that the process has been completed.

After the execution status indicates that the process has been completed, in the web browser 5, the data analysis unit 14 generates a request message that requests acquisition of an analysis result, and the communication unit 11 transmits the generated request message to the information processing system 20 in step S538. In step S539, in the information processing system 20, the communication unit 11 receives the request message from the web browser 5, and the chat control unit 23 transmits the request message to the generative AI system 50. In step S540, in response to the request message, the generative AI system 50 transmits the analysis result to the information processing system 20.

In the present embodiment, the operation from step S538 to step S540 is repeatedly performed for data output by the generative AI system 50 as the analysis result. Specifically, suppose that, for example, the generative AI system 50 has obtained text data and image data as the analysis result. In this case, in the present embodiment, the operation from step S538 to step S540 is repeated to acquire each of the text data and the image data.

After the information processing system 20 acquires all the analysis result obtained by the generative AI system 50, the report creation unit 28 creates a report using the acquired analysis result in step S541.

In the present embodiment, a plurality of types of templates for the report may be stored, and the user of the user terminal 10 may select the template for the report. In the present embodiment, the setting information storage unit 24 may store information indicating the template for the report. In this case, the generative AI system 50 may designate the template to be acquired by the report creation unit 28.

In step S542, in the information processing system 20, the communication unit 21 transmits the created report to the user terminal 10, i.e., the web browser 5. In the web browser 5, the communication unit 11 receives the report, and in step S543, the display control unit 12 displays the report.

For example, when the user of the user terminal 10 wishes a report of another pattern, the user just inputs a chat message indicating that wish. In this case, the report creation system 100 may repeat the operation in and after step S527.

In the present embodiment, by just selecting an analysis-target application and inputting a chat message related to analysis in this manner, the user of the user terminal 10 can acquire a report including an analysis result of data managed by the desired application. Thus, the present embodiment successfully assists creation of a report using a generative AI system.

Second Embodiment

A second embodiment of the present disclosure will be described below with reference to the accompanying drawings. The second embodiment differs from the first embodiment in that an administrator of the application service 40 differs from an administrator of the information processing system 20 and two web browsers collaborate with each other on the user terminal 10. Thus, differences from the first embodiment will be described in the second embodiment below, and components having the same or substantially the same functional configuration as the corresponding components in the first embodiment are denoted by the same reference signs as those used in the description of the first embodiment to omit the description thereof.

Figure 6:
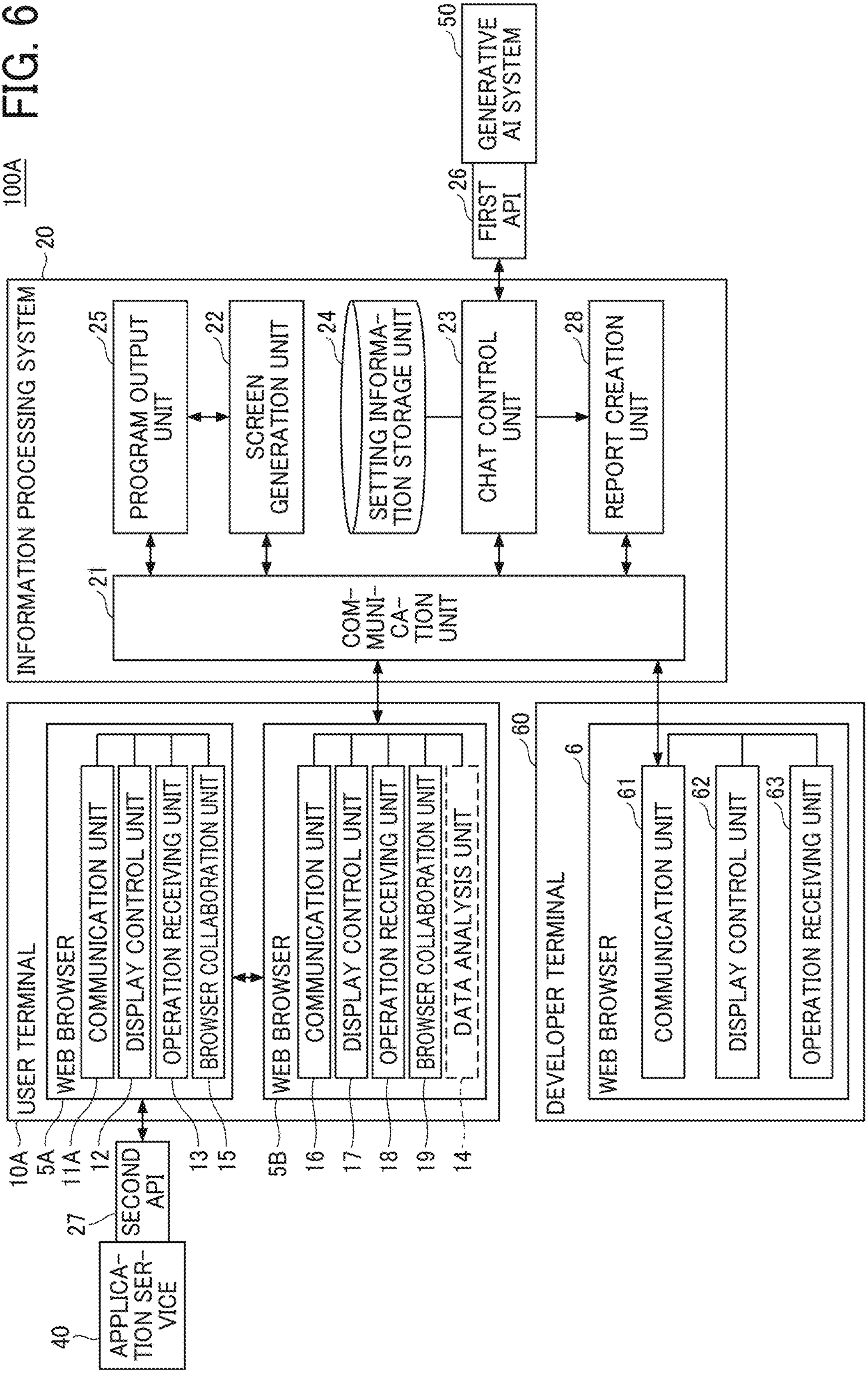
FIG. 6 is a diagram for describing functions of an information processing system, a user terminal, and a developer terminal included in a report creation system according to a second embodiment of the present disclosure.

FIG. 6 is a diagram for describing functions of an information processing system, a user terminal, and a developer terminal included in a report creation system according to the second embodiment of the present disclosure.

A report creation system 100A includes a user terminal 10A, the information processing system 20, the application service 40, the generative AI system 50, and the developer terminal 60.

The user terminal 10A includes a web browser 5A and a web browser 5B. The web browser 5A is provided by a provider of the application service 40. The web browser 5B is provided by a provider of the information processing system 20. The web browser 5A is an example of a first web browser. The web browser 5B is an example of a second web browser.

The web browser 5A includes a communication unit 11A, the display control unit 12, the operation receiving unit 13, and a browser collaboration unit 15.

The communication unit 11A transmits and receives information to and from the application service 40. The communication unit 11A receives screen information of an application list screen, information related to an application subjected to analysis, analysis-target data, and the like from the application service 40.

The browser collaboration unit 15 transmits and receives information to and from the web browser 5B. For example, the browser collaboration unit 15 supplies the web browser 5B with the information related to the application, the analysis-target data, and the like received by the communication unit 11A from the application service 40.

The web browser 5B communicates with the generative AI system 50 via the information processing system 20.

The web browser 5B includes a communication unit 16, a display control unit 17, an operation receiving unit 18, a browser collaboration unit 19, and the data analysis unit 14.

The communication unit 16 transmits and receives information to and from the information processing system 20. For example, the communication unit 16 transmits a chat message input on the web browser 5B to the information processing system 20. The communication unit 16 receives a response message, which the information processing system 20 has received from the generative AI system 50, from the information processing system 20.

The browser collaboration unit 19 transmits and receives information to and from the web browser 5A. For example, the browser collaboration unit 19 supplies the web browser 5A with the response message from the generative AI system 50, which the communication unit 16 has received from the information processing system 20.

As described above, in the present embodiment, the single user terminal 10 can concurrently execute a plurality of web browsers. The browser collaboration unit 15 allows the web browser 5A to notify the other web browser, i.e., the web browser 5B of information. The browser collaboration unit 19 allows the web browser 5B to notify the other web browser, i.e., the web browser 5A of information.

In the present embodiment, the plurality of web browsers collaborate together. Thus, when one web browser among the web browsers holds authentication information for a specific web site (e.g., the application service 40), the other web browser collaborates with the one web browser to successfully communicate with the specific web site.

That is, in the present embodiment, the web browser 5A and the web browser 5B communicate with each other. Thus, the web browser 5B collaborates with the web browser 5A holding the authentication information for the application service 40 to successfully communicate with the application service 40.

Figure 7A:
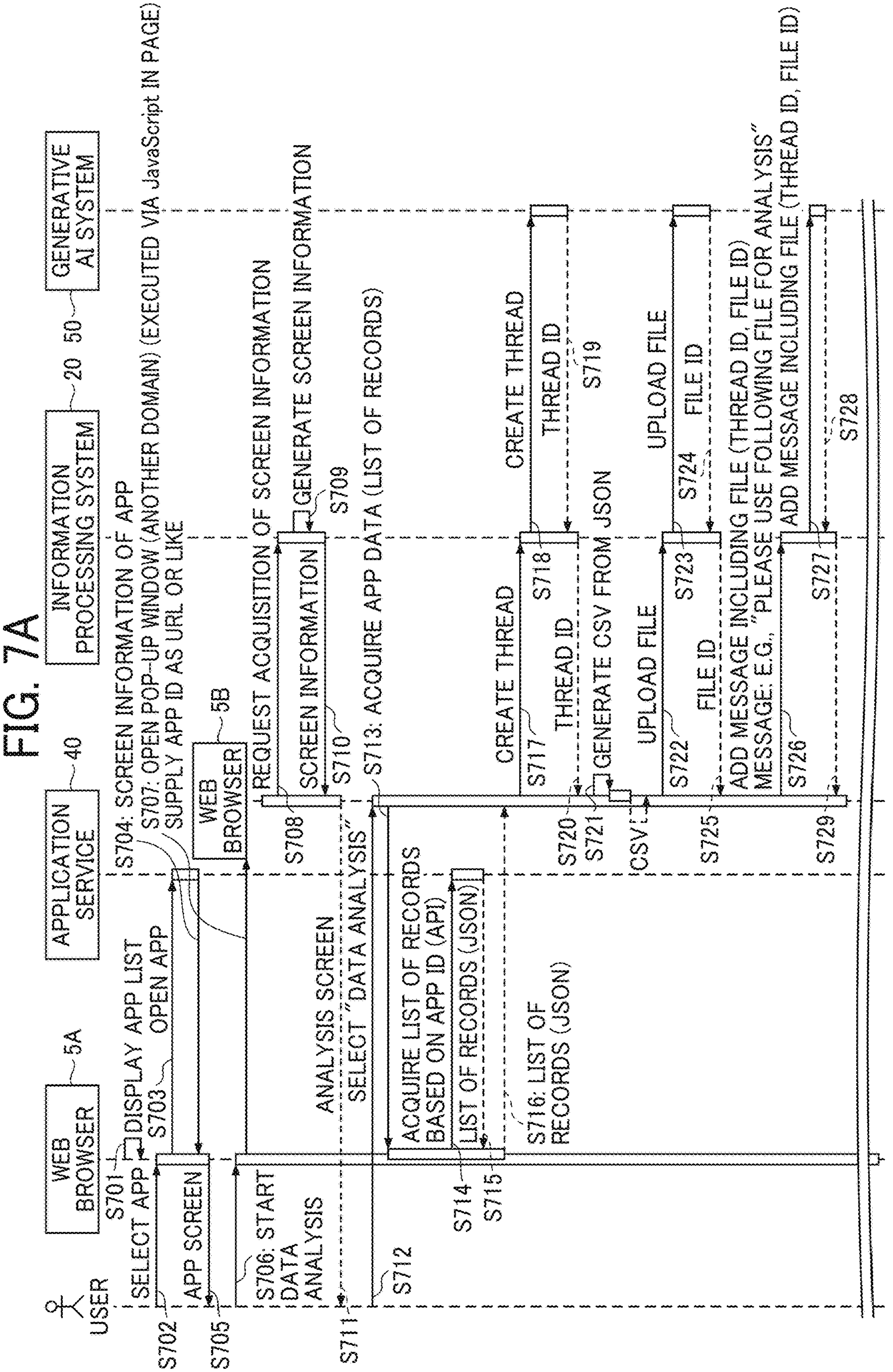
FIG. 7A is a first sequence diagram for describing an operation of the report creation system according to the second embodiment of the present disclosure.
Figure 7B:
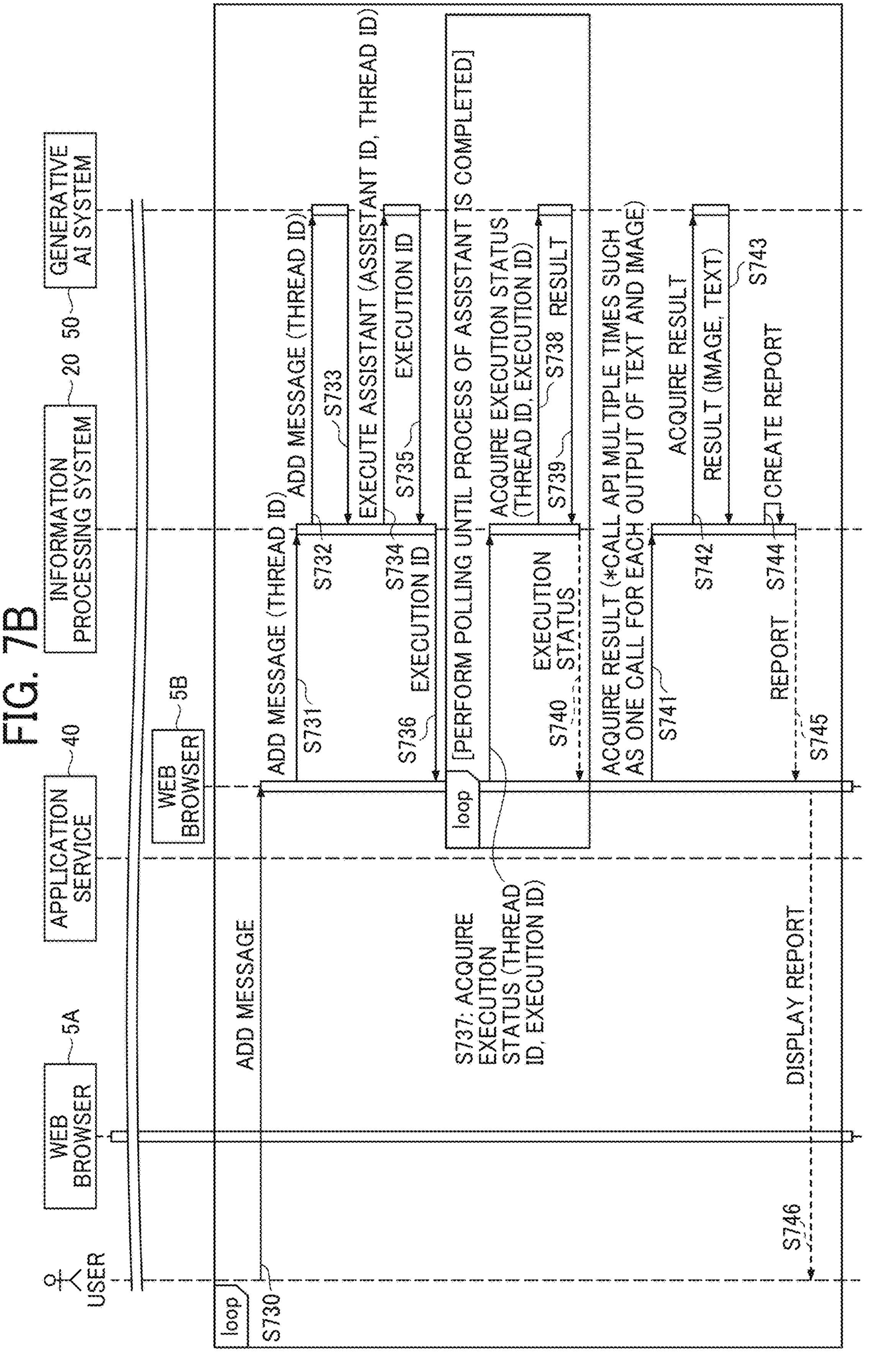
FIG. 7B is a second sequence diagram for describing the operation of the report creation system according to the second embodiment of the present disclosure.

An operation of the report creation system 100A according to the present embodiment will be described with reference to FIGS. 7A and 7B. FIG. 7A is a first sequence diagram for describing the operation of the report creation system in the second embodiment. FIG. 7B is a second sequence diagram for describing an example of the operation of the report creation system in the second embodiment.

Processing from step S701 to step S706 in FIG. 7A is substantially the same as the processing from step S501 to step S506 in FIG. 5A except that the web browser 5A performs the processing instead of the web browser 5. Thus, the description is omitted.

In step S706, in the user terminal 10, the web browser 5A receives an operation for starting analysis of the analysis-target data on the app screen. In step S707, the browser collaboration unit 15 opens the web browser 5B.

This processing by the browser collaboration unit 15 causes the web browser 5B to be displayed as a pop-up on the user terminal 10. At this time, the browser collaboration unit 15 notifies the web browser 5B of the app ID of the application selected as the analysis target in step S702 in a form of a URL or the like. Note that the web browser 5B is opened via JavaScript included in the screen information of the app screen.

In step S708, in the web browser 5B of the user terminal 10, the communication unit 16 uses the app ID which the web browser 5B is notified of by the web browser 5A to transmit, to the information processing system 20, a request message that requests acquisition of screen information of the analysis screen. The request message transmitted to the information processing system 20 includes the app ID of the analysis-target application.

After the information processing system 20 receives the request message from the web browser 5B, the screen generation unit 22 generates the screen information of the analysis screen (such as HTML, JavaScript, and CSS) in step S709. In step S710, the communication unit 21 transmits the screen information of the analysis screen to the web browser 5B. In the web browser 5B, the communication unit 16 receives the screen information of the analysis screen from the information processing system 20. The screen information of the analysis screen includes the program for analysis written in JavaScript.

In step S711, in the web browser 5B, the display control unit 17 displays the analysis screen.

In step S712, in the web browser 5B, the operation receiving unit 18 receives an operation for starting analysis of the analysis-target data on the analysis screen.

In step S713, in the web browser 5B, the data analysis unit 14 supplies, via the browser collaboration unit 19, the web browser 5A with a request message that requests acquisition of analysis-target data managed by the analysis-target application identified by the app ID. This request message includes the app ID of the analysis-target application.

The web browser 5A receives the request message via the browser collaboration unit 15. In step S714, the communication unit 11A transmits the request message that requests acquisition of the analysis-target data to the application service 40.

In response to the request message, the application service 40 transmits, as the analysis-target data (in the JSON format), data managed by the analysis-target application identified by the app ID to the web browser 5A in step S715.

In step S716, the web browser 5A supplies, via the browser collaboration unit 15, the web browser 5B with the analysis-target data acquired from the application service 40.

After the web browser 5B acquires the analysis-target data, the data analysis unit 14 generates a request message that requests creation of a thread, and the communication unit 16 transmits the generated request message to the information processing system 20 in step S717.

The subsequent operation from step S718 in FIG. 7A to step S746 in FIG. 7B is substantially the same as the operation from step S516 in FIG. 5A to step S542 in FIG. 5B except that the web browser 5B replaces the web browser 5. Thus, the description is omitted.

As described above, in the present embodiment, in the single user terminal 10, the web browser 5A and the web browser 5B provided by different providers collaborate with each other.

This allows the web browser 5B that does not hold authentication information for accessing the application service 40 to communicate with the application service 40 via the web browser 5A holding the authentication information for accessing the application service 40.

Thus, when the provider of the application service 40 differs from the provider of the information processing system 20 and the web browser 5A and the web browser 5B have different domains, the function provided by the information processing system 20 is allowed to collaborate with the application provided by the application service 40.

An operation of the report creation system 100A according to the present embodiment will be specifically described below.

Figure 8:
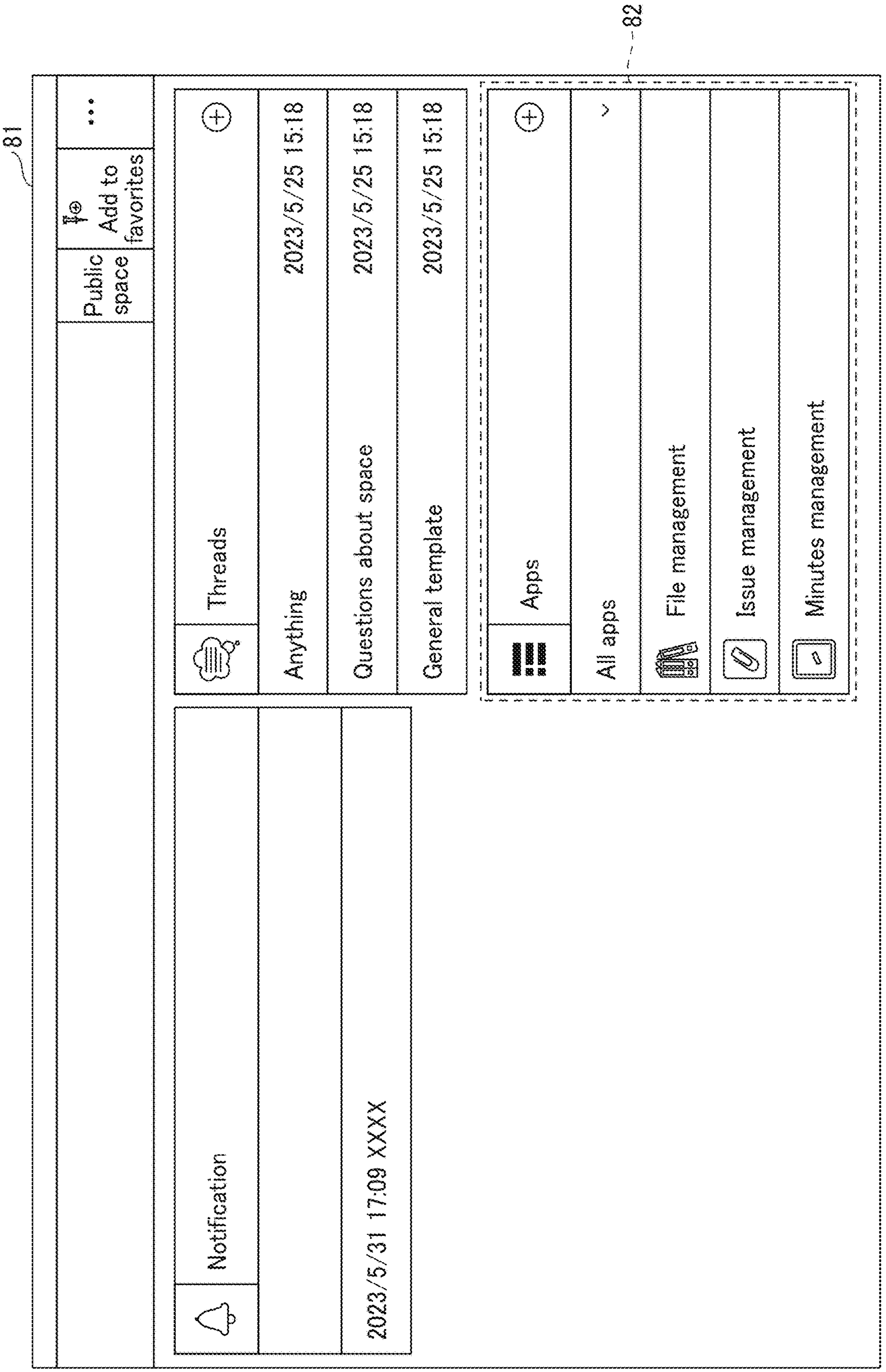
FIG. 8 is a first diagram illustrating a display example on the user terminal in the second embodiment of the present disclosure.

FIG. 8 is a first diagram illustrating a display example on the user terminal in the second embodiment of the present disclosure. For example, a screen 81 illustrated in FIG. 8 is an example of the application list screen displayed by the web browser 5A on the display 506 in step S701 in FIG. 7A.

The screen 81 includes a display area 82. The display area 82 displays a list of applications made available to the user of the user terminal 10 among applications provided by the application service 40.

In the present embodiment, in response to selection of an analysis-target application in the display area 82, the web browser 5A acquires screen information of an app screen of the selected application from the application service 40, and displays the app screen on the display 506.

Figure 9:
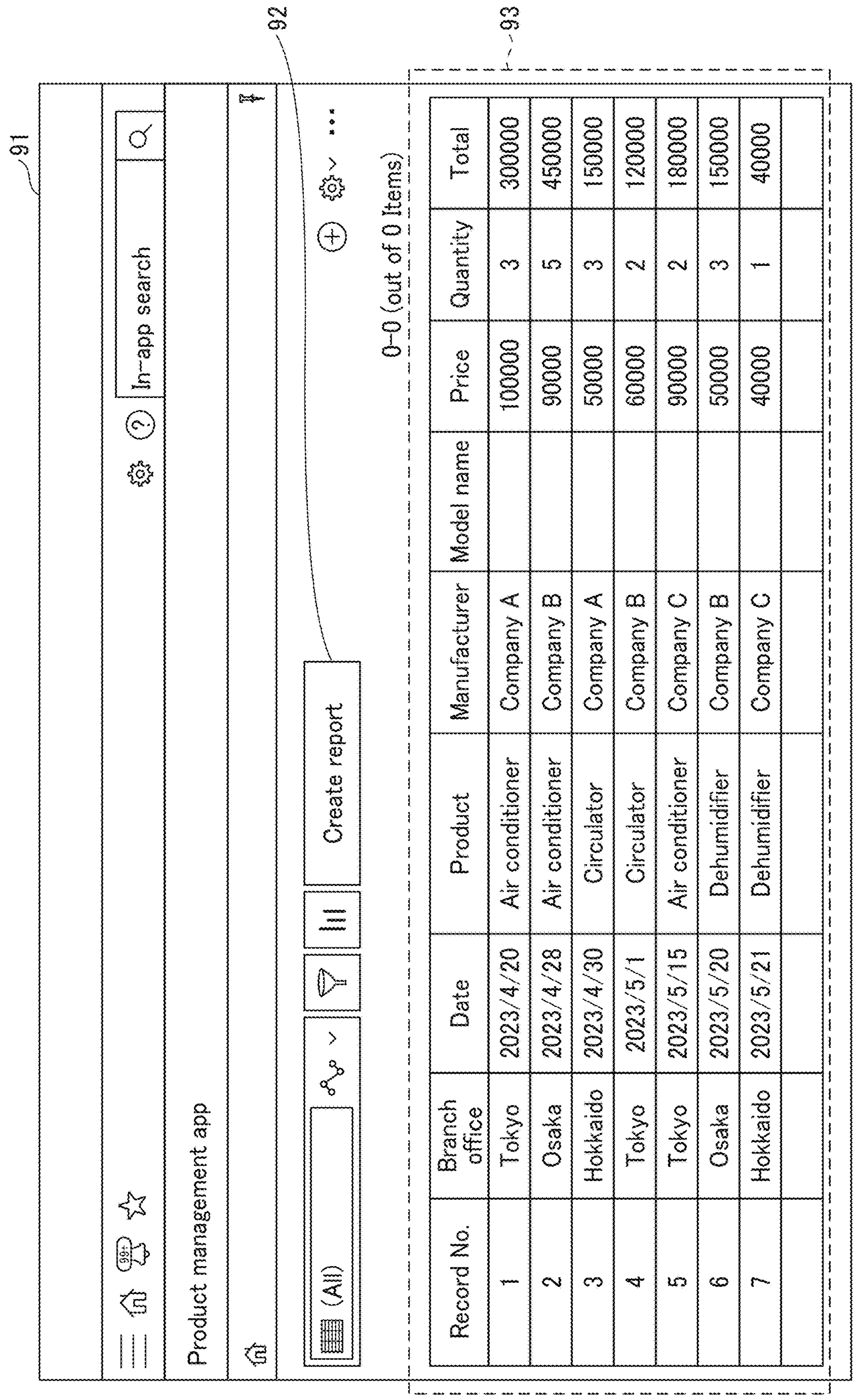
FIG. 9 is a second diagram illustrating a display example on the user terminal in the second embodiment of the present disclosure.

FIG. 9 is a second diagram illustrating a display example on the user terminal in the second embodiment of the present disclosure. For example, a screen 91 illustrated in FIG. 9 is an example of the app screen displayed by the web browser 5A on the display 506 in step S705 in FIG. 7A. The screen 91 illustrated in FIG. 9 is the app screen displayed when a "product management app" is selected as the analysis-target application in the screen 81 illustrated in FIG. 8.

The screen 91 includes an operation button 92 and a display area 93. The operation button 92 is an operation button for starting analysis of the analysis-target data. The display area 93 displays data managed by the "product management app". That is, the display area 93 displays a list of records included in the data managed by the analysis-target application.

In the present embodiment, in response to an operation on the operation button 92, the web browser 5A regards the operation as the start of analysis of the analysis-target data, and opens the web browser 5B.

After the web browser 5B is opened, the data analysis unit 14 acquires the analysis-target data from the application service 40 via the web browser 5A, and transmits a request message that requests creation of a thread to the generative AI system 50 via the information processing system 20.

FIG. 10A are diagrams illustrating an example of the request message that requests creation of a thread and a corresponding response message in the second embodiment of the present disclosure. A description 101A illustrated in FIG. 10A represents the request message that requests creation of a thread.

After receiving the request message represented by the description 101A from the information processing system 20, the generative AI system 50 transmits a response message including a thread ID to the information processing system 20. The information processing system 20 transmits the response message including the thread ID to the web browser 5B (see step S719 and step S720 in FIG. 7A).

A description 101B illustrated in FIG. 10B is an example of the response message including the thread ID. The description 101B includes a thread ID "abc123" of a thread created by the chat history holding function of the generative AI system 50 or of the first API 26.

After acquiring the thread ID "abc123", the web browser 5B creates a file for analysis from the analysis-target data. The web browser 5B transmits, to the generative AI system 50 via the information processing system 20, a request message that requests uploading of the file for analysis to the thread identified by the thread ID "abc123".

In the example in FIGS. 7A and 7B, the file for analysis is created after the thread is created. However, the timing at which the file for analysis is created is not limited to this timing. The file for analysis may be created after the analysis-target data is acquired from the application service 40. Thus, the file for analysis may be created before the thread is created.

FIGS. 11A and 11B are diagrams illustrating an example of a request message that requests uploading of the file for analysis and a corresponding response message in the second embodiment of the present disclosure. A description 110A illustrated in FIG. 11A represents the request message that requests uploading of the file for analysis.

The request message represented by the description 110A indicates that uploading of a file for analysis having a file name "mydata.csv" is requested.

After receiving the request message represented by the description 110A from the information processing system 20, the generative AI system 50 transmits, to the information processing system 20, a response message 110B including a file ID "file-abc123" for identifying the uploaded file for analysis. The information processing system 20 transmits the response message including the file ID "file-abc123" to the web browser 5B (see step S724 and step S725 in FIG. 7A).

After acquiring the file ID "file-abc123", the web browser 5B transmits, to the generative AI system 50 via the information processing system 20, a request message that requests designation of the file for analysis to be referred to by the thread (see step S726 and step S727 in FIG. 7A). The file for analysis is the file for analysis that has the file name "mydata.csv" and is identified by the file ID "file-abc123".

In the present embodiment, in response to an operation on the operation button 92 in the screen 91 illustrated in FIG. 9, the web browser 5B is displayed as a pop-up over the screen 91.

Figure 12:
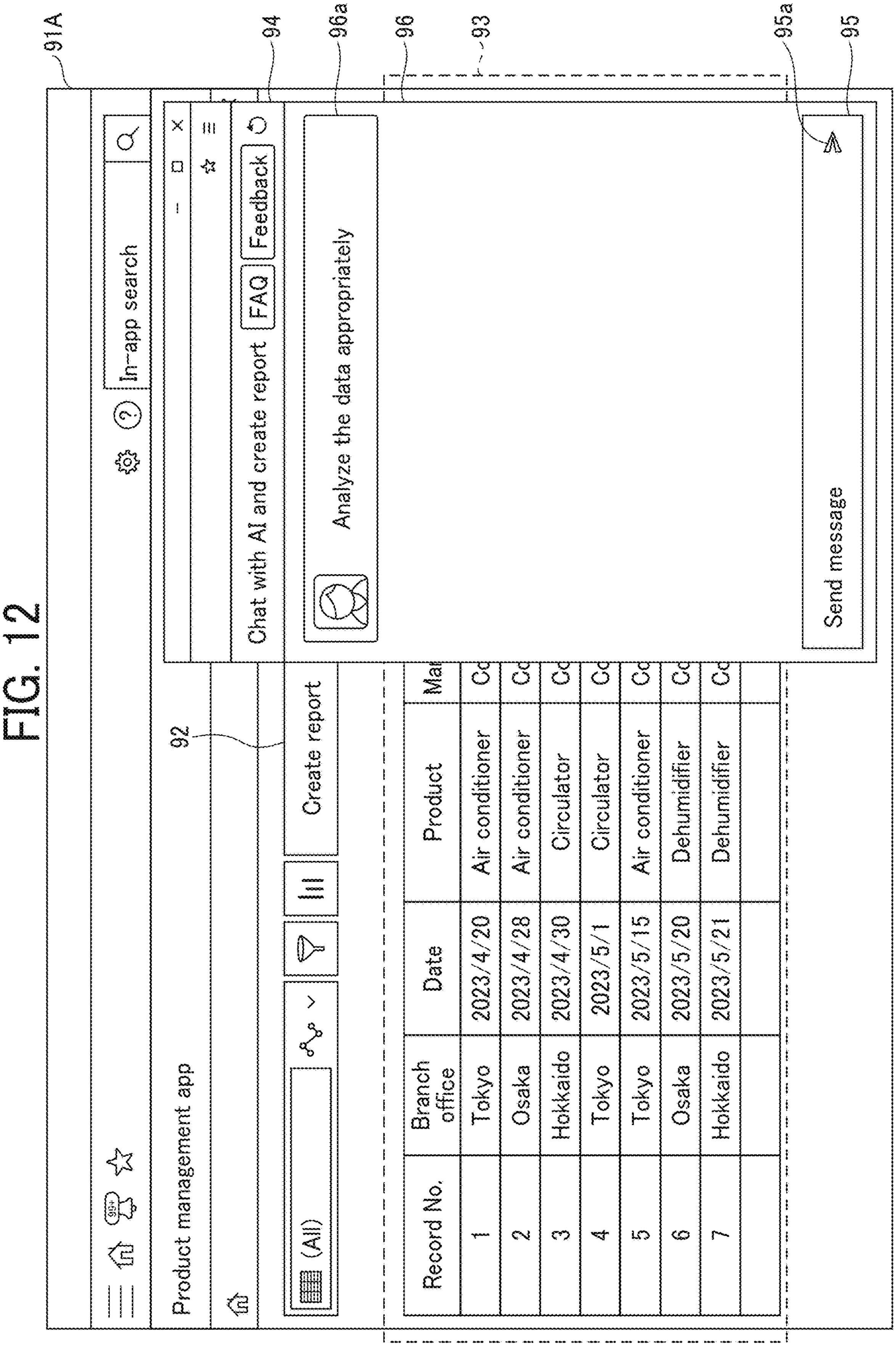
FIG. 12 is a third diagram illustrating a display example on the user terminal in the second embodiment of the present disclosure.

FIG. 12 is a third diagram illustrating a display example on the user terminal in the second embodiment of the present disclosure. For example, a screen 91A illustrated in FIG. 12 is an example of a screen displayed when a chat message is input in the analysis screen displayed on the user terminal 10 in step S711 in FIG. 7A. Specifically, the screen 91A presents an example of a screen that displays a chat message input in step S730 on the analysis screen displayed as a pop-up by the web browser 5B.

The screen 91A includes a pop-up window 94 displayed by the web browser 5B. The pop-up window 94 includes an input field 95 and a display area 96. The input field 95 includes an operation button 95*a*. When the user inputs a chat message and selects the operation button 95*a*, the input chat message is transmitted to the information processing system 20.

The display area 96 includes a display area 96*a*. In the example in FIG. 12, the display area 96*a* displays the chat message that has been input in the input field 95. The display area 96 displays a chat history of a chat between the user and the generative AI system 50.

The example in FIG. 12 presents a state in which the user has input a chat message "Analyze the data appropriately".

In the example in FIG. 12, the pop-up window 94 is displayed over the screen 91A. Alternatively, the pop-up window 94 may be displayed in another area different from the area displaying the screen 91A on the display 506 of the user terminal 10.

In the present embodiment, in response to selection of the operation button 95*a* in the screen 91A illustrated in FIG. 12, the web browser 5B generates a request message that requests addition of the chat message input in the input field 95 to the thread, and transmits the request message to the information processing system 20. The information processing system 20 transmits the request message to the generative AI system 50 (see step S731 and step S732 in FIG. 7B).

FIG. 13 is a diagram illustrating an example of the request message that requests addition of a chat message to the thread in the second embodiment of the present disclosure. A description 130 illustrated in FIG. 13 represents the request message that requests addition of the chat message to the thread.

The request message represented by the description 130 includes the thread ID "abc123" of the thread to which the chat message is to be added, the chat message "Analyze the data appropriately", and the file ID "file-abc123" of the file for analysis.

In response to the request message, the generative AI system 50 transmits, to the information processing system 20, a response message indicating that the chat message has been added to the thread in step S733 in FIG. 7B.

The information processing system 20 receives the response message, and transmits a request message that requests execution of an assistant according to the chat message to the generative AI system 50 in step S734 in FIG. 7B. After receiving this request message, the generative AI system 50 starts executing the assistant and transmits, to the web browser 5B via the information processing system 20, a response message including an execution ID for identifying the process in execution, in step S735 and step S736 in FIG. 7B.

FIGS. 14A and 14B are diagrams illustrating an example of the request message that requests execution of an assistant according to the chat message and a corresponding response message in the second embodiment of the present disclosure. A description 140A illustrated in FIG. 14A represents the request message that requests execution of the assistant according to the chat message.

The request message represented by the description 140A includes the thread ID "abc123" of the thread to which the chat message has been added, and an assistant ID "asst_abc123" of the first API 26 that is to execute the process.

A description 140B illustrated in FIG. 14B represents an example of the response message to the request message represented by the description 140A.

The response message represented by the description 140B includes an execution ID "run_abc123" for identifying the process in execution.

After execution of the process is started, the web browser 5B generates a request message that requests acquisition of the execution status of the process identified by the execution ID, and transmits the generated request message to the generative AI system 50 via the information processing system 20 in step S737 and step S738 in FIG. 7B.

FIG. 15 is a diagram illustrating an example of the request message that requests acquisition of the execution status of the process identified by the execution ID in the second embodiment of the present disclosure. A description 150 illustrated in FIG. 15 represents the request message that requests acquisition of the execution status of the process identified by the execution ID.

The request message represented by the description 150 includes the thread ID "abc123" and the execution ID "run_abc123" for identifying the process in execution. For each step of the process that is identified by the execution ID and executed in the thread identified by the thread ID, the web browser 5B transmits the request message represented by the description 150 to the generative AI system 50. That is, the generative AI system 50 performs polling to acquire the execution status for each step of the process identified by the execution ID.

Each time the generative AI system 50 receives the request message represented by the description 150, the generative AI system 50 transmits, to the web browser 5B via the information processing system 20, a response message including the execution status indicating the progress of execution of the process in step S739 and step S740 in FIG. 7B.

FIG. 16 is a diagram illustrating an example of the response message including the execution status in the second embodiment of the present disclosure. A description 160 illustrated in FIG. 16 indicates that text data identified by a message ID "msg_abc123" has been acquired in a step identified by a step ID "step_abc123" in the process identified by the execution ID "run_abc123".

The description 160 also indicates that automatically generated program code has been executed and image data identified by a file ID "image-xyz789" has been acquired in a step identified by a step ID "step_abc456" in the process identified by the execution ID "run_abc123".

As described above, the web browser 5B acquires the execution status for each step of the process identified by the execution ID until the execution of the process identified by the execution ID ends. In the web browser 5, after the execution of the process identified by the execution ID ends, the data analysis unit 14 generates a request message that requests acquisition of an analysis result and the communication unit 11 transmits the generated request message to the generative AI system 50 via the information processing system 20 in step S741 and step S742 in FIG. 7B.

The analysis result in this case is a processing result included in the execution status. Thus, in this case, the text data identified by the message ID "msg_abc123" and the image data identified by the file ID "image-xyz789" correspond to the analysis result.

In step S741 and step S742 in FIG. 7B, the web browser 5B transmits a request message that requests acquisition of an analysis result to the generative AI system 50 via the information processing system 20 for each processing result included in the execution status.

FIG. 17 is a first diagram illustrating the request message that requests acquisition of the analysis result in the second embodiment of the present disclosure. The request message represented by a description 170 illustrated in FIG. 17 requests acquisition of text data that has been acquired as the processing result. More specifically, the request message represented by the description 170 includes the thread ID "abc123" and the message ID "msg_abc123", and requests acquisition of the text data that is identified by the message ID "msg_abc123" and is a result of the process executed by the thread identified by the thread ID "abc123".

After receiving the request message represented by the description 170 from the web browser 5B, the generative AI system 50 outputs a response message including the text data identified by the message ID "msg_abc123" to the information processing system 20 in step S743 in FIG. 7B.

FIG. 18 is a diagram illustrating an example of a response message including text data in the second embodiment of the present disclosure. A description 180 illustrated in FIG. 18 represents a response message that is output from the generative AI system 50 in response to the request message represented by the description 170.

The description 180 includes the text data, i.e., "The analysis result is presented below", identified by the message ID "msg_abc123". In this manner, the information processing system 20 acquires the analysis result obtained for the file for analysis by the generative AI system 50.

The web browser 5B transmits a request message that requests acquisition of an analysis result to the generative AI system 50 via the information processing system 20 until all the data that has been acquired as the processing result is acquired.

FIG. 19 is a second diagram illustrating a request message that requests acquisition of an analysis result in the second embodiment of the present disclosure. A request message represented by a description 190 illustrated in FIG. 19 requests acquisition of image data that has been acquired as the processing result. More specifically, the request message represented by the description 190 includes the file ID "image-xyz789" and requests acquisition of the image data identified by the file ID "image-xyz789".

In the present embodiment, after the information processing system 20 receives the analysis result from the generative AI system 50 in this manner, the report creation unit 28 may create a report using the analysis result, and cause the web browser 5B to display the created report. The information processing system 20 may hold the report created using the analysis result, and cause the web browser 5B to display a storage location of the report.

Figure 20:
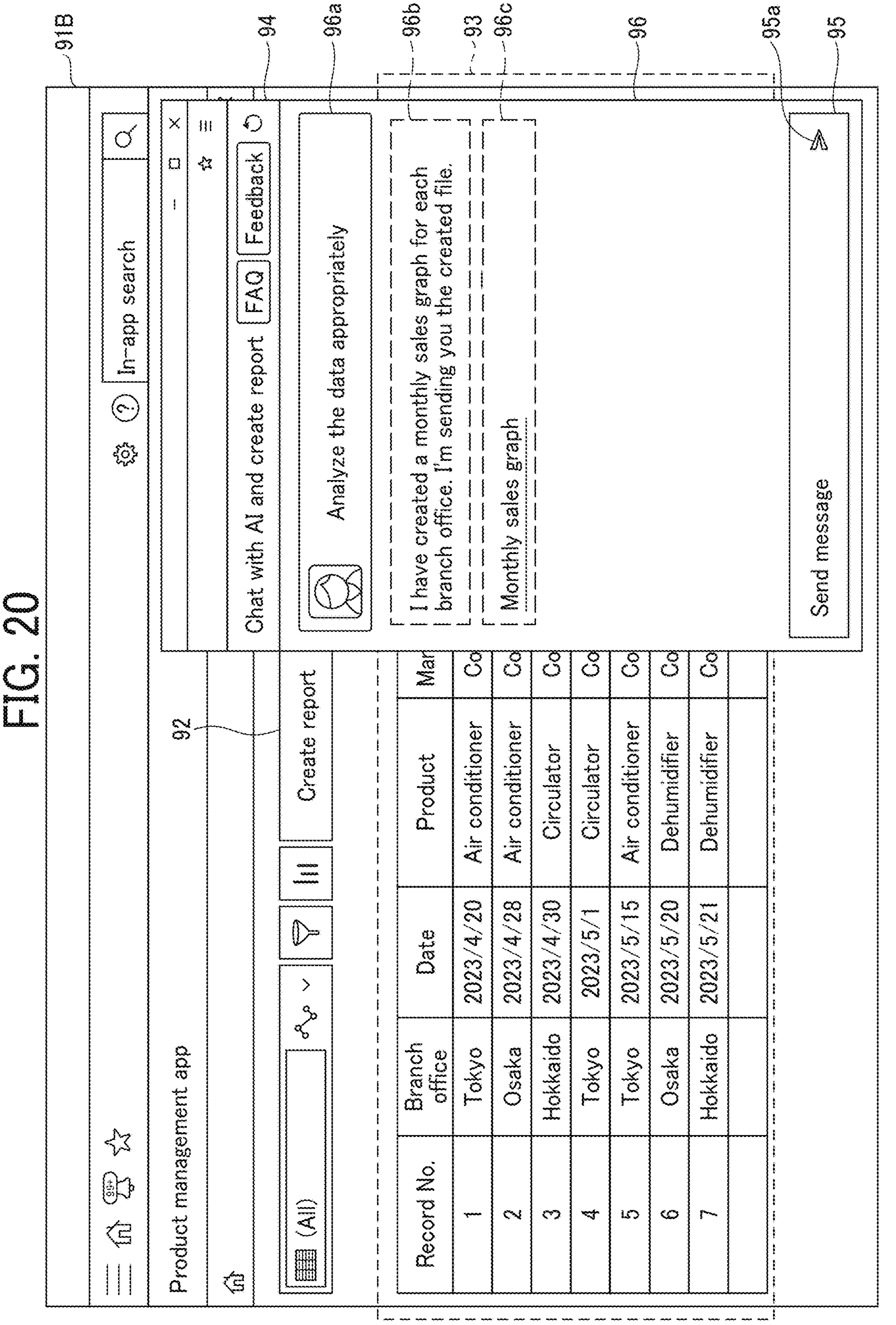
FIG. 20 is a fourth diagram illustrating a display example on the user terminal in the second embodiment of the present disclosure.

FIG. 20 is a fourth diagram illustrating a display example on the user terminal in the second embodiment of the present disclosure. For example, a screen 91B illustrated in FIG. 20 is an example of a screen displayed on the user terminal 10 in step S746 in FIG. 7B.

The display area 96 of the screen 91B illustrated in FIG. 20 includes display areas 96*a*, 96*b*, and 96*c*. The display area 96*b* may display text data created by the report creation unit 28. For example, the report creation unit 28 edits the text data included in the analysis result acquired from the generative AI system 50 to generate the text data to be displayed in the display area 96*b*.

The display area 96*c* may display a storage location (link) of the report created by the report creation unit 28. In the present embodiment, selecting the storage location (link) displayed in the display area 96*c* may display the report stored at the storage location on the screen 91B.

The text data displayed in the display area 96*b* may be the message acquired from the generative AI system 50 as it is. The display area 96 may not necessarily include the display area 96*b*.

In the example in FIG. 20, the display area 96 displays the storage location of the report. However, the configuration is not limited to this one. The display area 96 may display the report created by the report creation unit 28.

Figure 21:
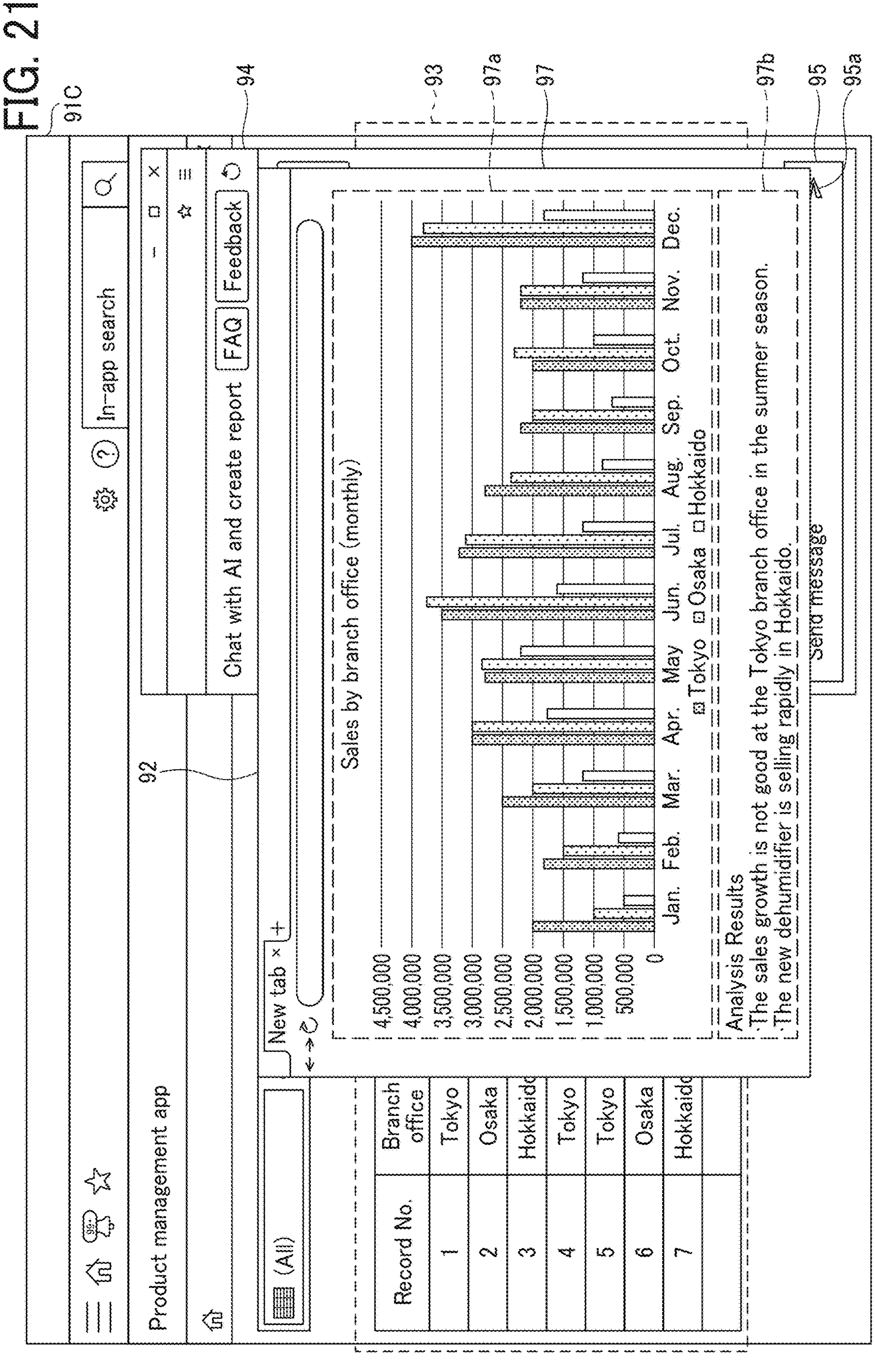
FIG. 21 is a fifth diagram illustrating a display example on the user terminal in the second embodiment of the present disclosure.

FIG. 21 is a fifth diagram illustrating a display example on the user terminal in the second embodiment of the present disclosure. For example, a screen 91C illustrated in FIG. 21 is an example of a screen displayed when the storage location displayed in the display area 96*c* of the screen 91B illustrated in FIG. 20 is selected.

The screen 91C illustrated in FIG. 21 displays a report 97. The report 97 includes display areas 97*a* and 97*b*. The display area 97*a* displays the image data acquired as the analysis result obtained by the generative AI system 50. The display area 97*b* displays the text data acquired as the analysis result obtained by the generative AI system 50.

As described above, in the present embodiment, the information processing system 20 allows the user terminal 10 to display data acquired as an analysis result by the generative AI system 50, as a report in an easy-to-view format for the user.

In the present embodiment, for example, conversion of the graph represented by the image data of the report 97 to another kind of graph is triggered by merely inputting a chat message indicating such conversion in the input field 95.

In each of the embodiments described above, the information processing system 20 includes the report creation unit 28. However, the configuration is not limited to this one. For example, the web browser 5B may include the report creation unit 28. In this case, the screen information of the analysis screen may include the program that implements the report creation unit 28.

Third Embodiment

A third embodiment of the present disclosure will be described below with reference to the accompanying drawings. In the third embodiment, in the report creation system 100 illustrated in FIG. 1, the information processing system 20 includes the functions of the application service 40. In the description of the third embodiment below, differences from the first embodiment will be described, and components having substantially the same functional configurations as those of the first embodiment are assigned the same reference signs as those used in the description of the first embodiment to omit description thereof.

Figure 22:
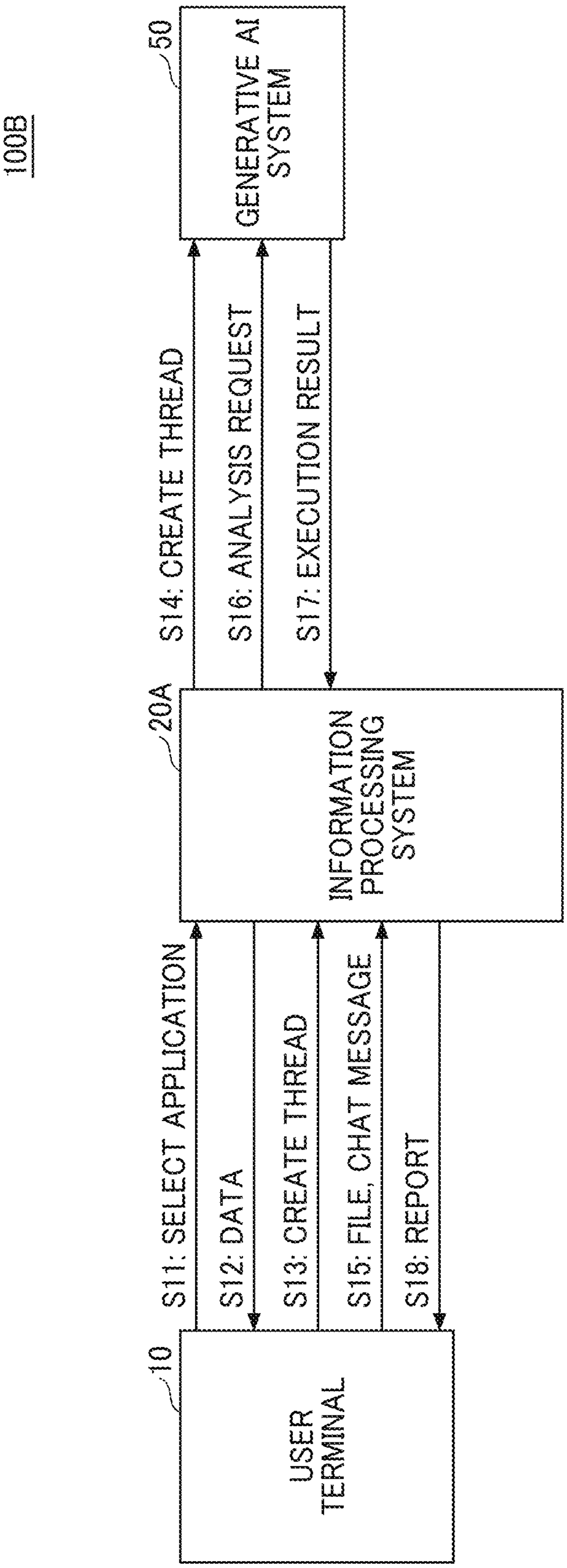
FIG. 22 is a diagram for describing an overview of an operation of a report creation system according to a third embodiment of the present disclosure.

An overview of an operation of a report creation system 100B according to the present embodiment will be described below with reference to FIG. 22. FIG. 22 is a diagram for describing an overview of an operation of the report creation system according to the third embodiment of the present disclosure.

In step S11, the user terminal 10 of the report creation system 100B selects an analysis-target application. In step S12, the user terminal 10 acquires analysis-target data from an information processing system 20A.

In step S13 and step S14, the user terminal 10 requests, via the information processing system 20A, the generative AI system 50 to create a thread. Since processing from step S13 to step S18 in FIG. 22 is substantially the same as the processing from step S3 to step S8 illustrated in FIG. 2, description thereof is omitted.

As described above, since the information processing system 20A includes the functions of the application service 40, the user terminal 10 can acquire the analysis-target data directly from the information processing system 20A.

Figure 23:
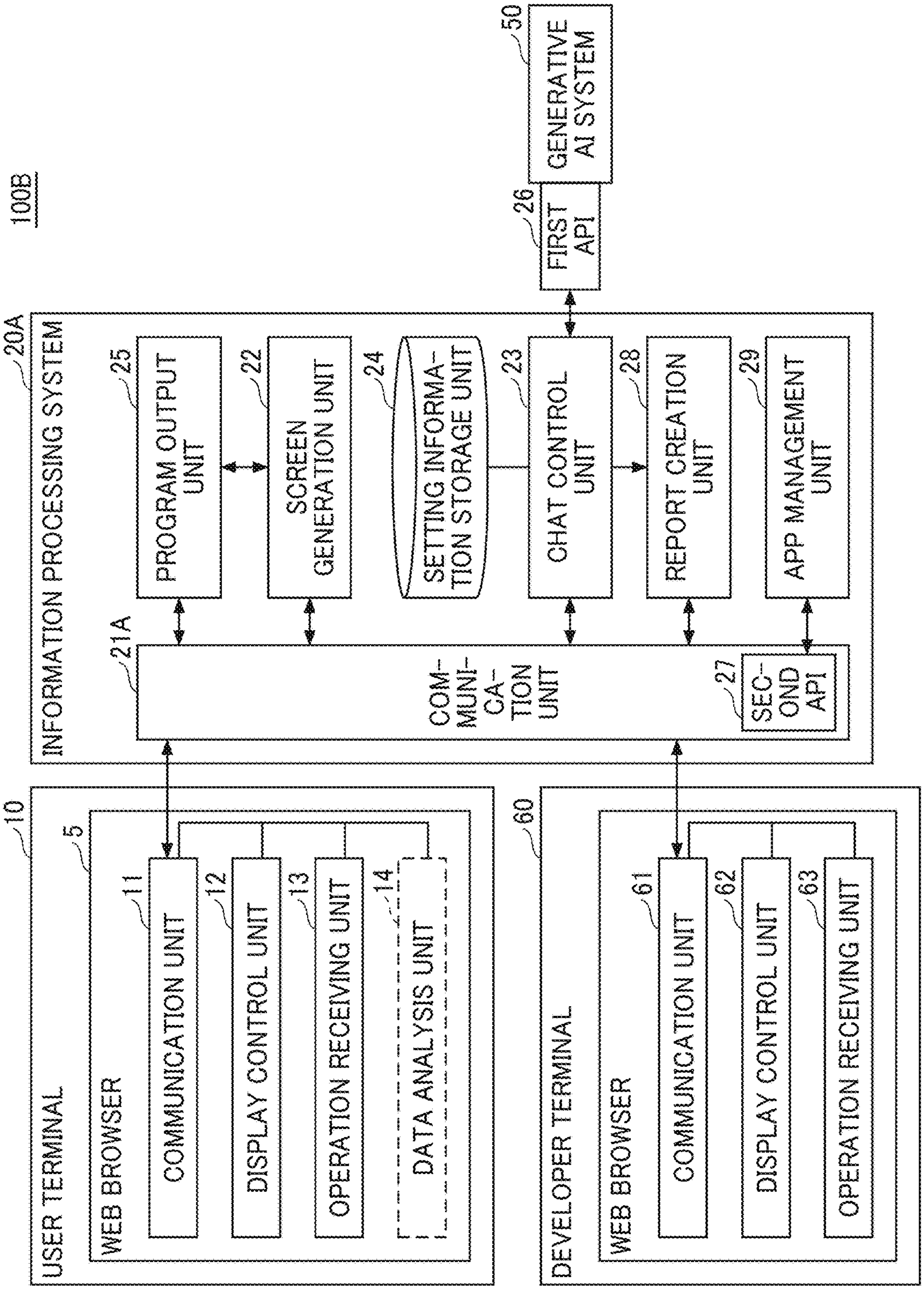
FIG. 23 is a diagram for describing functions of an information processing system, a user terminal, and a developer terminal included in the report creation system according to the third embodiment of the present disclosure.

Functions of the information processing system 20A, the user terminal 10, and the developer terminal 60 included in the report creation system 100B will be described with reference to FIG. 23. FIG. 23 is a diagram for describing functions of the information processing system, the user terminal, and the developer terminal included in the report creation system according to the third embodiment of the present disclosure.

In the report creation system 100B, the information processing system 20A includes a communication unit 21A, the screen generation unit 22, the chat control unit 23, the setting information storage unit 24, the program output unit 25, the report creation unit 28, and an app management unit 29.

In the present embodiment, the communication unit 21A includes the second API 27. The app management unit 29 manages applications to be provided to the user terminal 10. The applications managed by the app management unit 29 may include a web app that operates on the web browser 5 of the user terminal 10, for example. The applications managed by the app management unit 29 may include a database web application that manages data in a table format.

In the user terminal 10, the web browser 5 calls the second API 27 to transmit a request message that requests acquisition of analysis-target data to the information processing system 20A.

Figure 24:
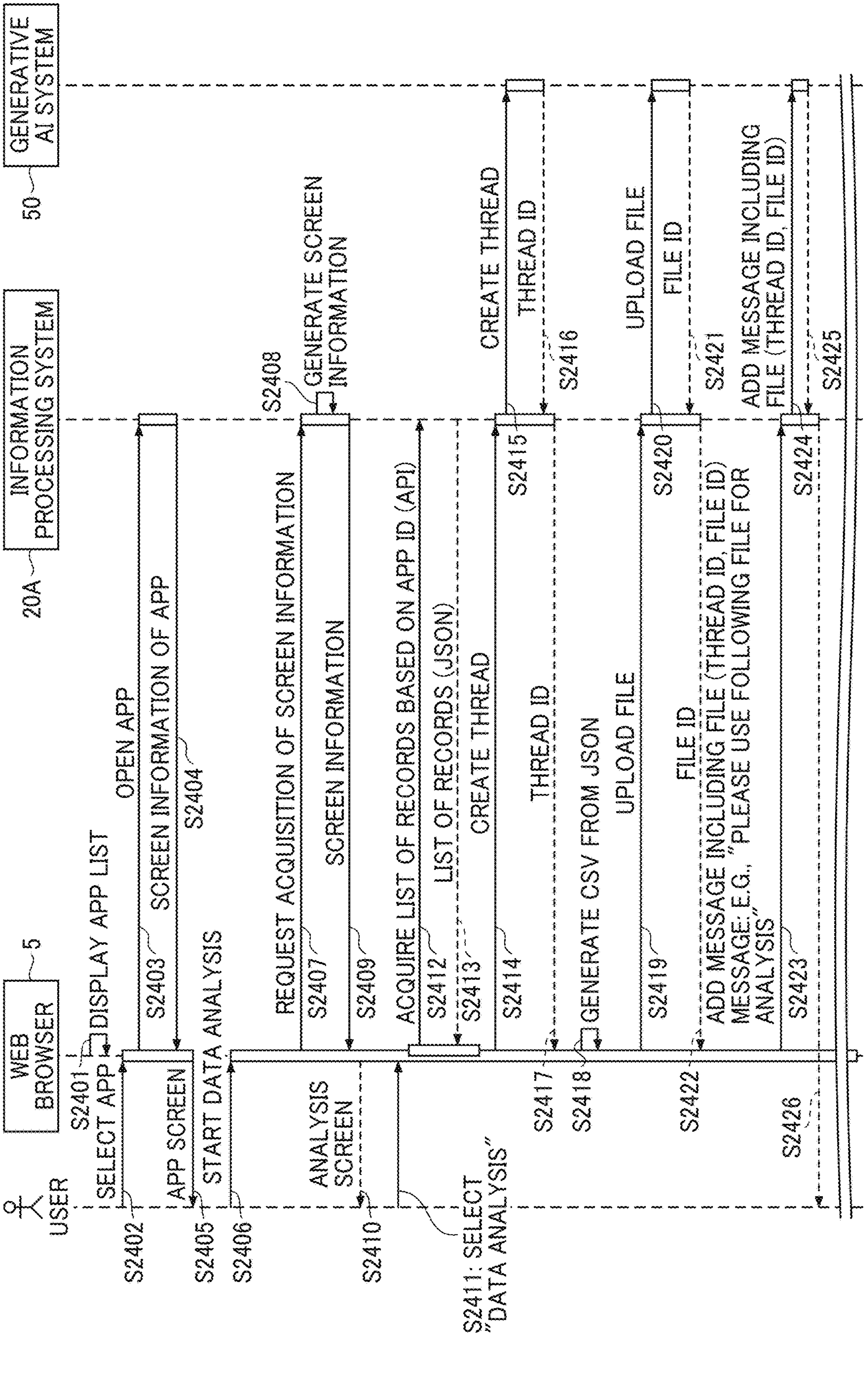
FIG. 24 is a sequence diagram for describing an operation of the report creation system according to the third embodiment of the present disclosure.

An operation of the report creation system 100B according to the present embodiment will be described with reference to FIG. 24. FIG. 24 is a sequence diagram for describing an operation of the report creation system according to the third embodiment of the present disclosure.

In step S2401, the web browser 5 of the user terminal 10 of the report creation system 100B displays an application list screen of the applications managed by the app management unit 29 of the information processing system 20A.

In the present embodiment, the application list screen may be displayed on the web browser 5 of the user terminal 10 when an operation for displaying a list of applications is performed on the web browser 5, for example. In response to this operation, the web browser 5 may acquire the application list screen from the information processing system 20A.

In step S2402, the web browser 5 receives an operation for selecting an analysis-target application in the application list screen.

In step S2403, the web browser 5 requests the information processing system 20A to start the selected application.

Specifically, in the web browser 5, the communication unit 11 establishes a connection to a URL of the information processing system 20A. The communication unit 11 of the user terminal 10 generates an HTTP request including a URL of an application screen (app screen) of the analysis-target application, and transmits the generated HTTP request to the information processing system 20A.

After receiving the HTTP request from the user terminal 10, the information processing system 20A transmits screen information of the app screen to the web browser 5 in step S2404. The process then proceeds to step S2405. Specifically, the information processing system 20A transmits the screen information of the app screen (such as HTML, JavaScript, and CSS) to the web browser 5.

Since processing from step S2405 to step S2411 in FIG. 24 is substantially the same as the processing from step S505 to step S511 illustrated in FIG. 5A, description thereof is omitted.

In the report creation system 100B, after the web browser 5 of the user terminal 10 receives an operation for starting analysis of the analysis-target data in step S2411, the web browser 5 executes a program for analysis to implement the data analysis unit 14. In step S2412, in the web browser 5, the data analysis unit 14 generates a request message that requests acquisition of the analysis-target data, and the communication unit 11 transmits the generated request message to the information processing system 20A.

Specifically, the web browser 5 calls the second API 27 to transmit the request message that requests acquisition of the analysis-target data to the information processing system 20A. This request message includes the app ID of the analysis-target application.

After receiving this request message, the information processing system 20A transmits, as the analysis-target data (in the JSON format), data managed by the application identified by the app ID to the web browser 5 in step S2413.

Since processing from step S2414 to step S2426 in FIG. 24 is substantially the same as the processing from step S514 to step S526 illustrated in FIG. 5A, description thereof is omitted.

The third embodiment above has described the configuration in which the information processing system 20A transmits the program for analysis written in JavaScript to the user terminal 10, and the user terminal 10 executes the received program for analysis.

Effects of using the program for analysis written in JavaScript will be described below.

If the user terminal 10 communicates with the information processing system 20A without using JavaScript, the user terminal 10 updates the screen at each processing. Thus, the usage of the communication band increases because of the update of the screen. Time taken to update the screen also increases.

In contrast, in the present embodiment, the user terminal 10 executes the program for analysis written in JavaScript asynchronously with the update of the screen. This allows the user terminal 10 to communicate with the information processing system 20A asynchronously with the update of the screen. Consequently, the increase in the usage of the communication band because of the update of the screen and the increase in the time to update the screen are successfully avoided.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The apparatuses or devices described in each embodiment are merely one example of a plurality of computing environments that implement one or more embodiments disclosed herein.

In some embodiments, an information processing apparatus of the information processing system 20 includes a plurality of computing devices such as a server cluster. The plurality of computing devices communicate with one another through any type of communication link including a network, shared memory, etc., and perform the processes disclosed herein. Likewise, in some embodiments, the information processing apparatus of the information processing system 20 may include a plurality of computing devices that communicate with one another.

The information processing apparatus of the information processing system 20 may share the processing steps disclosed herein in various combinations. For example, a process to be executed by a predetermined unit may be executed by the information processing apparatus of the information processing system 20. Likewise, a function of a predetermined unit may be executed by the information processing apparatus of the information processing system 20. Elements of the information processing apparatus included in the information processing system 20 may be integrated into a single server apparatus or may be distributed to a plurality of apparatuses.

Note that the information processing apparatus of the information processing system 20 may be an apparatus merely having a communication function. Examples of the information processing system 20 include, but not limited to, an output device such as a projector (PJ), an interactive whiteboard (IWB) which is a whiteboard having an electronic whiteboard function and a capability of mutual communication, or a digital signage, an HUD device, industrial machinery, an image-capturing device, a sound collector, medical equipment, a smart appliance, an automobile (connected car), a notebook PC, a mobile phone, a smartphone, a tablet terminal, a game machine, a PDA, a digital camera, a wearable PC, or a desktop PC.

In the present embodiment, the information processing system 20 supplies the generative AI system 50 with data managed by an application provided by the application service 40 to cause the generative AI system 50 to analyze the data, and acquires an analysis result from the generative AI system 50.

Specifically, in the present embodiment, the information processing system 20 communicates with the user terminal 10 and the generative AI system 50 via a network. The information processing system 20 identifies, among applications provided by the information processing system 20 or the application service 40, an analysis-target application for which the generative AI system 50 is requested to perform analysis, based on a user operation performed on the user terminal 10. The information processing system 20 acquires app data managed by the identified analysis-target application, and uses a web API provided by the generative AI system 50 to transmit the acquired app data to the generative AI system 50. When receiving a chat message transmitted from the user terminal 10, the information processing system 20 uses a web API to transmit the received chat message to the generative AI system 50. When receiving a reply transmitted by the generative AI system 50 based on the chat message and the app data that have been transmitted to the generative AI system 50, the information processing system 20 transmits the received reply to the user terminal 10.

The aspects of the present disclosure are as follows, for example.

According to Aspect 1, an information processing apparatus, which communicates with a terminal apparatus and a generative AI system via a network, includes a communication unit and a chat control unit. The communication unit receives, from the terminal apparatus, a request for acquiring screen information of an analysis screen of data managed by an application provided by the information processing apparatus or an application service, and transmits the screen information to the terminal apparatus. The screen information includes a program for analysis. The program for analysis causes the terminal apparatus to acquire the data managed by the application, create data for analysis from the acquired data, and upload the data for analysis to the generative AI system. In response to the communication unit receiving the data for analysis and a chat message related to analysis from the terminal apparatus, the chat message being input on the analysis screen displayed on the terminal apparatus, the chat control unit transmits, to the generative AI system, a request message that requests analysis of the data for analysis according to the chat message. The chat control unit receives a response message including an analysis result of the data for analysis from the generative AI system. The communication unit transmits a report including the analysis result to the terminal apparatus.

According to Aspect 2, in the information processing apparatus of Aspect 1, the terminal apparatus includes a first web browser and a second web browser. The first web browser communicates with the application service. The second web browser communicates with the first web browser. The communication unit receives, from the second web browser, the request for acquiring the screen information that has been transmitted from the first web browser to the second web browser in response to an operation on the first web browser, and transmits the screen information to the second web browser. In response to the communication unit receiving, from the second web browser, the data for analysis and the chat message input on the analysis screen displayed on the second web browser, the chat control unit transmits, to the generative AI system, a request message that requests analysis of the data for analysis according to the chat message. The communication unit further transmits a report including the analysis result acquired from the generative AI system to the second web browser.

According to Aspect 3, in the information processing apparatus of Aspect 2, in response to the communication unit receiving a request message that requests creation of a thread from the second web browser, the chat control unit transmits the request message that requests creation to the generative AI system, and acquires a thread ID for identifying the thread from the generative AI system. In response to the communication unit transmitting the thread ID to the second web browser and receiving, from the second web browser in response to the transmitting of the thread ID, a request message that requests uploading of the data for analysis to the generative AI system, the chat control unit transmits the request message that requests uploading to the generative AI system, and acquires a file ID for identifying the uploaded data for analysis from the generative AI system. In response to the communication unit transmitting the file ID to the second web browser and receiving, from the second web browser in response to the transmitting of the file ID, a request message that requests designation of the data for analysis to be referred to by the thread, the chat control unit transmits the request message that requests designation to the generative AI system.

According to Aspect 4, in the information processing apparatus of any one of Aspects 1 to 3, the data managed by the application includes data in a JavaScript® Object Notation (JSON) format, and the data for analysis includes a file in a comma-separated values (CSV) format.

According to Aspect 5, the information processing apparatus of any one of Aspects 1 to 4, further includes a report creation unit. The report creation unit uses the analysis result included in the response message to create the report. The communication unit transmits the report created by the report creation unit to the terminal apparatus.

According to Aspect 6, a report creation system includes a terminal apparatus and an information processing apparatus that communicate with each other via a network. The information processing apparatus includes a first communication unit and a chat control unit. The first communication unit receives, from the terminal apparatus, a request for acquiring screen information of an analysis screen of data managed by an application provided by the information processing apparatus or an application service, and transmits the screen information to the terminal apparatus. The screen information includes a program for analysis. The program for analysis causes the terminal apparatus to acquire the data managed by the application, create data for analysis from the acquired data, and upload the data for analysis to a generative AI system. In response to the first communication unit receiving the data for analysis and a chat message related to analysis from the terminal apparatus, the chat message being input on the analysis screen displayed on the terminal apparatus, the chat control unit transmits, to the generative AI system, a request message that requests analysis of the data for analysis according to the chat message. The chat control unit receives a response message including an analysis result of the data for analysis from the generative AI system. The first communication unit further transmits a report including the analysis result to the terminal apparatus. The terminal apparatus includes an operation receiving unit, a second communication unit, and a display control unit. The operation receiving unit receives an operation for starting analysis of data on the analysis screen displayed on a display of the terminal apparatus. The second communication unit executes the program for analysis in response to the operation for starting analysis of data to create the data for analysis, and transmits, to the information processing apparatus, a request message that requests uploading of the data for analysis to the generative AI system. The display control unit performs control to display the report received from the information processing apparatus on the display.

According to Aspect 7, a program causes an information processing apparatus, which communicates with a terminal apparatus and a generative AI system via a network, to execute a process including: receiving, from the terminal apparatus, a request for acquiring screen information of an analysis screen of data managed by an application provided by the information processing apparatus or an application service, and transmitting the screen information to the terminal apparatus, the screen information including a program for analysis, the program for analysis causing the terminal apparatus to acquire the data managed by the application, create data for analysis from the acquired data, and upload the data for analysis to the generative AI system; in response to receipt of the data for analysis and a chat message related to analysis from the terminal apparatus, the chat message being input on the analysis screen displayed on the terminal apparatus, transmitting, to the generative AI system, a request message that requests analysis of the data for analysis according to the chat message, and receiving a response message including an analysis result of the data for analysis from the generative AI system; and transmitting a report including the analysis result to the terminal apparatus.

According to Aspect 8, an information processing method, for an information processing apparatus that communicates with a terminal apparatus and a generative AI system via a network, includes: receiving, from the terminal apparatus, a request for acquiring screen information of an analysis screen of data managed by an application provided by the information processing apparatus or an application service, and transmitting the screen information to the terminal apparatus, the screen information including a program for analysis, the program for analysis causing the terminal apparatus to acquire the data managed by the application, create data for analysis from the acquired data, and upload the data for analysis to the generative AI system; in response to receipt of the data for analysis and a chat message related to analysis from the terminal apparatus, the chat message being input on the analysis screen displayed on the terminal apparatus, transmitting, to the generative AI system, a request message that requests analysis of the data for analysis according to the chat message, and receiving a response message including an analysis result of the data for analysis from the generative AI system; and transmitting a report including the analysis result to the terminal apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus communicably connected with a terminal apparatus and a generative AI system via a network, the information processing apparatus comprising:

a communication circuit to receive, from the terminal apparatus, a request for acquiring screen information of an analysis screen of data managed by an application provided by the information processing apparatus or an application service, and transmit the screen information to the terminal apparatus, the screen information including a program for analysis, the program for analysis causing the terminal apparatus to acquire the data managed by the application, create data for analysis from the acquired data, and upload the data for analysis to the generative AI system; and a chat control circuit to in response to receipt of the data for analysis and a chat message related to analysis from the terminal apparatus, the chat message being input on the analysis screen displayed on the terminal apparatus, transmit, to the generative AI system, a request message that requests analysis of the data for analysis according to the chat message, and receive a response message including an analysis result of the data for analysis from the generative AI system, wherein the communication circuit further transmits a report including the analysis result to the terminal apparatus.

2. The information processing apparatus according to claim 1, wherein the terminal apparatus executes a first web browser and a second web browser, the request for acquiring the screen information is transmitted from the first web browser to the communication circuit via the second web browser in response to an operation on the first web browser, the communication circuit transmits the screen information to the second web browser, the communication circuit receives the data for analysis and the chat message from the second web browser, the second web browser displaying the analysis screen, and the communication circuit transmits the report to the second web browser.

3. The information processing apparatus according to claim 2, wherein in response to the communication circuit receiving a request message that requests creation of a thread from the second web browser, the chat control circuit transmits the request message that requests creation to the generative AI system, and acquires a thread identifier (ID) for identifying the thread from the generative AI system, in response to the communication circuit transmitting the thread ID to the second web browser and receiving, from the second web browser in response to the transmitting of the thread ID, a request message that requests uploading of the data for analysis to the generative AI system, the chat control circuit transmits the request message that requests uploading to the generative AI system, and acquires a file ID for identifying the uploaded data for analysis from the generative AI system, and in response to the communication circuit transmitting the file ID to the second web browser and receiving, from the second web browser in response to the transmitting of the file ID, a request message that requests designation of the data for analysis to be referred to by the thread, the chat control circuit transmits the request message that requests designation to the generative AI system.

4. The information processing apparatus according to claim 1, wherein the data managed by the application includes data in a JavaScript® Object Notation (JSON) format, and the data for analysis includes a file in a comma-separated values (CSV) format.

5. The information processing apparatus according to claim 1, further comprising:

a report creation circuit to use the analysis result included in the response message to create the report, wherein the communication circuit transmits the report created by the report creation circuit to the terminal apparatus.

6. A report creation system comprising:

the information processing apparatus according to claim 1; and the terminal apparatus communicably connected with the information processing apparatus via the network, the terminal apparatus including circuitry configured to:

receive an operation for starting analysis of data on the analysis screen displayed on a display;

execute the program for analysis in response to the operation for starting analysis of data to create the data for analysis, and transmit, to the information processing apparatus, a request message that requests uploading of the data for analysis to the generative AI system; and display the report received from the information processing apparatus on the display.

7. A report creation system comprising:

a terminal apparatus including terminal circuitry; and an information processing apparatus communicably connected with the terminal apparatus and a generative AI system via a network, the information processing apparatus comprising apparatus circuitry configured to:

receive, from the terminal apparatus, a request for acquiring screen information of an analysis screen of data managed by an application provided by the information processing apparatus or an application service;

transmit the screen information to the terminal apparatus, the screen information including a program for analysis, the program for analysis causing the terminal apparatus to acquire the data managed by the application, create data for analysis from the acquired data, and upload the data for analysis to the generative AI system;

in response to receipt of the data for analysis and a chat message related to analysis from the terminal apparatus, the chat message being input on the analysis screen displayed on the terminal apparatus, transmit, to the generative AI system, a request message that requests analysis of the data for analysis according to the chat message;

receive a response message including an analysis result of the data for analysis from the generative AI system; and transmit a report including the analysis result to the terminal apparatus, the terminal circuitry being configured to:

receive an operation for starting analysis of data on the analysis screen displayed on a display;

execute the program for analysis in response to the operation for starting analysis of data to create the data for analysis, and transmit, to the information processing apparatus, a request message that requests uploading of the data for analysis to the generative AI system; and display the report received from the information processing apparatus on the display.

8. An information processing method performed by an information processing apparatus communicably connected with a terminal apparatus and a generative AI system via a network, the information processing method comprising:

receiving, from the terminal apparatus, a request for acquiring screen information of an analysis screen of data managed by an application provided by the information processing apparatus or an application service;

transmitting the screen information to the terminal apparatus, the screen information including a program for analysis, the program for analysis causing the terminal apparatus to acquire the data managed by the application, create data for analysis from the acquired data, and upload the data for analysis to the generative AI system;

in response to receipt of the data for analysis and a chat message related to analysis from the terminal apparatus, the chat message being input on the analysis screen displayed on the terminal apparatus, transmitting, to the generative AI system, a request message that requests analysis of the data for analysis according to the chat message;

receiving a response message including an analysis result of the data for analysis from the generative AI system; and transmitting a report including the analysis result to the terminal apparatus.

* * * * *